(12) United States Patent
Greenberger

(10) Patent No.: US 10,710,122 B2
(45) Date of Patent: Jul. 14, 2020

(54) MATERIAL REMOVAL FROM SURFACES

(71) Applicant: Hal P. Greenberger, Natick, MA (US)

(72) Inventor: Hal P. Greenberger, Natick, MA (US)

( * ) Notice: Subject to any disclaimer, the term of this patent is extended or adjusted under 35 U.S.C. 154(b) by 603 days.

(21) Appl. No.: 15/464,235

(22) Filed: Mar. 20, 2017

(65) Prior Publication Data

US 2017/0274425 A1 Sep. 28, 2017

Related U.S. Application Data

(60) Provisional application No. 62/311,954, filed on Mar. 23, 2016.

(51) Int. Cl.
| | |
|---|---|
| *B08B 1/00* | (2006.01) |
| *B60S 3/04* | (2006.01) |
| *A47L 1/06* | (2006.01) |
| *B25G 1/06* | (2006.01) |
| *B25G 3/38* | (2006.01) |
| *B25G 1/10* | (2006.01) |

(52) U.S. Cl.
CPC ............... *B08B 1/005* (2013.01); *A47L 1/06* (2013.01); *B25G 1/06* (2013.01); *B25G 1/102* (2013.01); *B25G 3/38* (2013.01); *B60S 3/045* (2013.01)

(58) Field of Classification Search
CPC .. A47L 1/06; B08B 1/005; B25G 1/06; B25G 1/102; B25G 3/38; B60S 3/045
See application file for complete search history.

(56) References Cited

U.S. PATENT DOCUMENTS

| | | | |
|---|---|---|---|
| 2,236,093 A * | 3/1941 | Friend .................... | B44D 3/162 30/172 |
| 3,130,436 A | 4/1964 | Krause et al. | |
| 4,164,801 A | 8/1979 | Thomas | |
| 4,305,175 A * | 12/1981 | Burgess, Jr. .............. | A47L 1/16 15/236.02 |
| 4,418,439 A | 12/1983 | Porchet | |
| 4,574,417 A * | 3/1986 | Magnasco ............... | A47L 13/08 15/236.05 |
| 4,712,269 A | 12/1987 | Worthen | |
| 4,719,660 A * | 1/1988 | Hopkins ................. | B60S 3/045 15/105 |
| 4,970,749 A | 11/1990 | Priore | |
| 4,979,302 A * | 12/1990 | Magnasco ............... | B26B 5/005 30/169 |

(Continued)

OTHER PUBLICATIONS

Hopkins Subzero 16621 Ice Crusher Ice Scraper, https://www.amazon.com/Hopkins-Subzero-16621-Crusher-Scraper/dp/B001DKO3X6/ref=sr_1_4?ie=UTF8&qid=1470412273&sr=8-4&keywords=ice+scraper , retrieved from the Internet Jun. 14, 2017.

(Continued)

*Primary Examiner* — Marc Carlson

(57) ABSTRACT

Scrapers for removing adhered material from surfaces employ continuous and discontinuous material removal edges to remove different types of material. Continuous and sometimes discontinuous material removal edges are constructed and arranged to conform to the curvature of a surface from which material is to be removed, when a user forces the scraper against the surface. Some scrapers include multiple material removal edges designed to simultaneously contact the surface. The use of multiple points of contact combined with locations of handles provide stable designs that reduce hand and wrist strain.

21 Claims, 15 Drawing Sheets

(56) References Cited

U.S. PATENT DOCUMENTS

| | | | | |
|---|---|---|---|---|
| 4,984,324 | A | * | 1/1991 | Farris ............... A47L 13/08 15/236.05 |
| 5,263,222 | A | * | 11/1993 | Johnstone, II ........ A47L 13/022 15/236.02 |
| 5,349,716 | A | * | 9/1994 | Millar ............... A47L 1/06 15/236.06 |
| 5,398,364 | A | | 3/1995 | Vogt |
| 5,471,698 | A | * | 12/1995 | Francis ............. A47L 13/08 15/144.1 |
| 5,680,668 | A | * | 10/1997 | Kim ............... A47L 1/16 15/236.02 |
| 5,706,553 | A | | 1/1998 | Riley et al. |
| 5,822,825 | A | | 10/1998 | West |
| 6,018,836 | A | | 2/2000 | Williams |
| D422,125 | S | * | 3/2000 | Sneed ............... D32/49 |
| 6,092,255 | A | * | 7/2000 | Kim ............... A47L 1/06 15/105 |
| 6,243,906 | B1 | * | 6/2001 | Holliday ............ A46B 15/0055 15/111 |
| 6,282,742 | B1 | | 9/2001 | Boggs |
| D485,034 | S | * | 1/2004 | Anderson ............ D32/49 |
| 7,103,936 | B1 | * | 9/2006 | Brandon ............ B27G 17/04 15/236.05 |
| 7,249,393 | B2 | | 7/2007 | Marion et al. |
| 7,526,831 | B2 | | 5/2009 | Weinberger et al. |
| 7,814,610 | B2 | | 10/2010 | Weinberger et al. |
| 7,913,349 | B2 | * | 3/2011 | Byrnes ............... A47L 1/16 15/236.01 |
| D672,923 | S | * | 12/2012 | Loudenback ............ D30/158 |
| D672,924 | S | * | 12/2012 | Amice ............... D30/158 |
| 9,101,253 | B2 | * | 8/2015 | Johnstone ............ A47L 13/08 |
| D790,140 | S | * | 6/2017 | Amice ............... D30/158 |
| 2013/0174367 | A1 | * | 7/2013 | Johnstone ............ A47L 13/08 15/144.4 |

OTHER PUBLICATIONS

Best Ice Scraper With Water Proof Storage Bag—Ultra Durable Ice Chisel With Foam Grip for Scraping Ice From Car and Truck Windows and Windshields—So Good We Back it with a 10 Year Guarantee, https://www.amazon.com/Mountain-Scraper-Durable-Scraping-Windshields/dp/B00R6XAM0C/ref=sr_1_2?ie=UTF8&qid=1470412273&sr=8-2-spons&keywords=ice+scraper&psc=1, retrieved from the Internet Jun. 14, 2017.

SubZero Snowbrush and Ice Scraper, http://www.autozone.com/shop-and-garage-tools/snowbrush-and-ice-scraper/subzero-10-in-ice-chisel-scraper/955053_0_0 , retrieved from the Internet Jun. 14, 2017.

Hopkins 15613 Subzero 23" Falcon Snowbrush, https://www.amazon.com/Hopkins-15613-Subzero-Falcon-Snowbrush/dp/B001DETS5K/ref=sr_1_28?ie=UTF8&qid=1492272015&sr=8-28&keywords=ice+scraper&refinements=p_89%3ASubzero, retrieved from the Internet Jun. 14, 2017.

Shooter et al., "Building a Better Ice Scraper—A Case in Product Platforms for the Entrepreneur", pp. 1-26; To appear in: Journal of Intelligent Manufacturing; Special Issue on Product Family Design and Development.

"Double Bladed Ice Scraper for Automotive Windshields Is Introduced" (PRWEB) Jan. 22, 2004. Retrieved from the Internet May 24, 2017, URL: <http://www.prweb.com/releases/2004/01/prweb99975.htm>.

International Search Report and Written Opinion dated Jun. 16, 2017 for International application No. PCT/US17/23685.

* cited by examiner

MATERIAL REMOVAL FROM SURFACES

CROSS-REFERENCE TO RELATED APPLICATIONS

This application claims benefit from U.S. Provisional Patent Application No. 62/311,954, filed Mar. 23, 2016, the contents of which are incorporated herein by reference in its entirety.

BACKGROUND

This disclosure relates to removing adhered material from a surface, and in particular to removal of frozen material from environmentally exposed surfaces such as window and windshield glass of motor vehicles. Prior art devices suffer from a number of problems such as: poor ergonomics, failure to remove material over a wide path causing inefficiency in material removal, and use of material removal surfaces that are easily damaged. Additionally, prior art devices may be large and bulky and may not easily fit in available storage spaces.

SUMMARY

Examples of scrapers for removing adhered material from surfaces are disclosed herein. Examples employ continuous and discontinuous material removal edges. The scrapers are constructed such that material removal edges can conform to the curvature of a surface from which material is to be removed, when a user applies a force to push the scraper against the surface. Various scrapers include multiple material removal edges designed to simultaneously contact the surface. The use of multiple points of contact combined with locations of handles provide stable designs that reduce hand and wrist strain. Numerous other improvements and advantages are described. All examples and features mentioned below can be combined in any technically possible way.

In one aspect, a scraper for removing adhered material from a surface having a curved shape comprises a first material removal wall comprising a first material removal edge which is continuous, where the first material removal edge is capable of being deformed to conform to the shape of the surface, a second material removal wall comprising a second material removal edge which is discontinuous, where the first and second material removal edges are spaced apart from each other, a handle for gripping the scraper, where a projected location of the handle is located between projected locations of the first and second material removal edges, a first structure that is coupled to the first material removal wall near the first material removal edge and to one or both of the handle and the second material removal wall forming a first truss, where the first truss variably transforms bending loads applied to the first material removal edge into tension and compression loads in the first truss, wherein the handle is mechanically coupled to top ends of the first and second material removal walls opposite the ends of the first and second material removal walls incorporating the first and second material removal edges, wherein the scraper is constructed and arranged so that the continuous and discontinuous material removal edges can make simultaneous contact with the surface, and included angles, formed between the first and second material removal walls and the surface when both the continuous material removal edge and the discontinuous material removal edge of the scraper are in contact with the surface are effective for scraping.

Embodiments may include one of the following features, or any combination thereof. The first material removal edge is pre-biased to have curved shape in an unloaded condition. The first structure couples to the midpoint of the first material removal wall and also couples to the second material removal wall. A second structure coupled to the first material removal wall near the first material removal edge, and to one or both of the handle and the second material removal wall forming a second truss, wherein both the first and second trusses comprise truss panels, wherein the first and second trusses variably transform bending loads applied to the first material removal edge into tension and compression loads in the second truss, wherein the first and second trusses form first and second side walls of the scraper. The first and second truss panels are open. The openings in the first and second truss panels are not large enough to allow a user's thumb to fully penetrate through the opening. The first material removal edge is made of brass. The second material removal edge is made of brass. The scraper is constructed and arranged such that it can fit into typical sized glove boxes and storage bins of automotive vehicles. When the scraper is pressed against a surface having a radius of curvature greater than or equal to 1.5 meters with a force applied to the handle of 50N, the force applied by the first material removal edge to the surface is at least 10 N at every point along the width of the first material removal edge. The width of the first material removal edge is at least 100 mm.

The handle is mechanically coupled to top ends of first and second material removal walls over the entire widths of top ends of the first and second material removal walls. The handle is arranged such that the palm of a user's hand can rest on the handle and the user's fingers can rest on either of the first or second material removal walls, to allow the user to apply a force to the handle with their palm and to apply a force to either of the first or second material removal walls with their fingers. The projected location of the center of mass of the scraper is located between the projected locations of the first material removal edge and the second material removal edge. When the first and second material removal edges are in contact with the surface, the handle is sufficiently above the surface so that the user's thumb and little fingers can rest on the side walls of the scraper without interference from the surface. The included angles are between 30 and 60 degrees. The first and second material removal edges are spaced apart a distance greater than 70 mm. The first truss has a shape that can be triangular or trapezoidal. The width of the second material removal edge is narrower than the width of the first material removal edge.

In one aspect, a scraper for removing adhered material from a surface comprises a first material removal wall comprising a first continuous material removal edge and a second material removal wall comprising a second continuous material removal edge, wherein the first and second material removal edges are spaced apart from each other, wherein the first and second material removal edges are capable of being deformed to conform to the shape of the surface, a handle for gripping the scraper located between projected locations of the first and second material removal edges, wherein the handle is mechanically coupled to top ends of the first and second material removal walls, opposite ends of the first and second material removal walls that incorporate the first and second material removal edges, wherein the scraper further comprises a first structure coupled to the first material removal wall near the first material removal edge and coupled to the second material removal wall near the second material removal edge forming a first truss, to variably transform bending loads applied to the first material removal edge and the second material removal edge into tension and compression loads in the first truss, wherein the scraper is constructed and arranged such that the first and second material removal edges can make simultaneous contact with the surface, and wherein included angles, formed between the first and second material removal walls and the surface when both the first material removal edge and the second material removal edge of the scraper are in contact with the surface, are effective for scraping.

Embodiments may include one of the following features, or any combination thereof. The first material removal edge is pre-biased to have curved shape in an unloaded condition. The second material removal edge is pre-biased to have curved shape in an unloaded condition. The pre-biased curvature of the first material removal edge is different from the pre-biased curvature of the second material removal edge.

DETAILED DESCRIPTION

The examples described herein are shown in the context of removing frozen material such as frost and ice from environmentally exposed surfaces such as the windows and windshields of a motorized vehicle. However, the principles, features structures and methods depicted in the examples disclosed herein are applicable in general to the removal of adhered material (such as paint, stains, surface coatings, frost, ice, etc.) from a wide range of surfaces (wood, plastic, metal, glass, etc.), and are not limited to the removal of frozen material. Example devices will be generally referred to as scrapers for ease of description, but use of the term scraper is not meant to be limiting in any manner.

Figure 1:
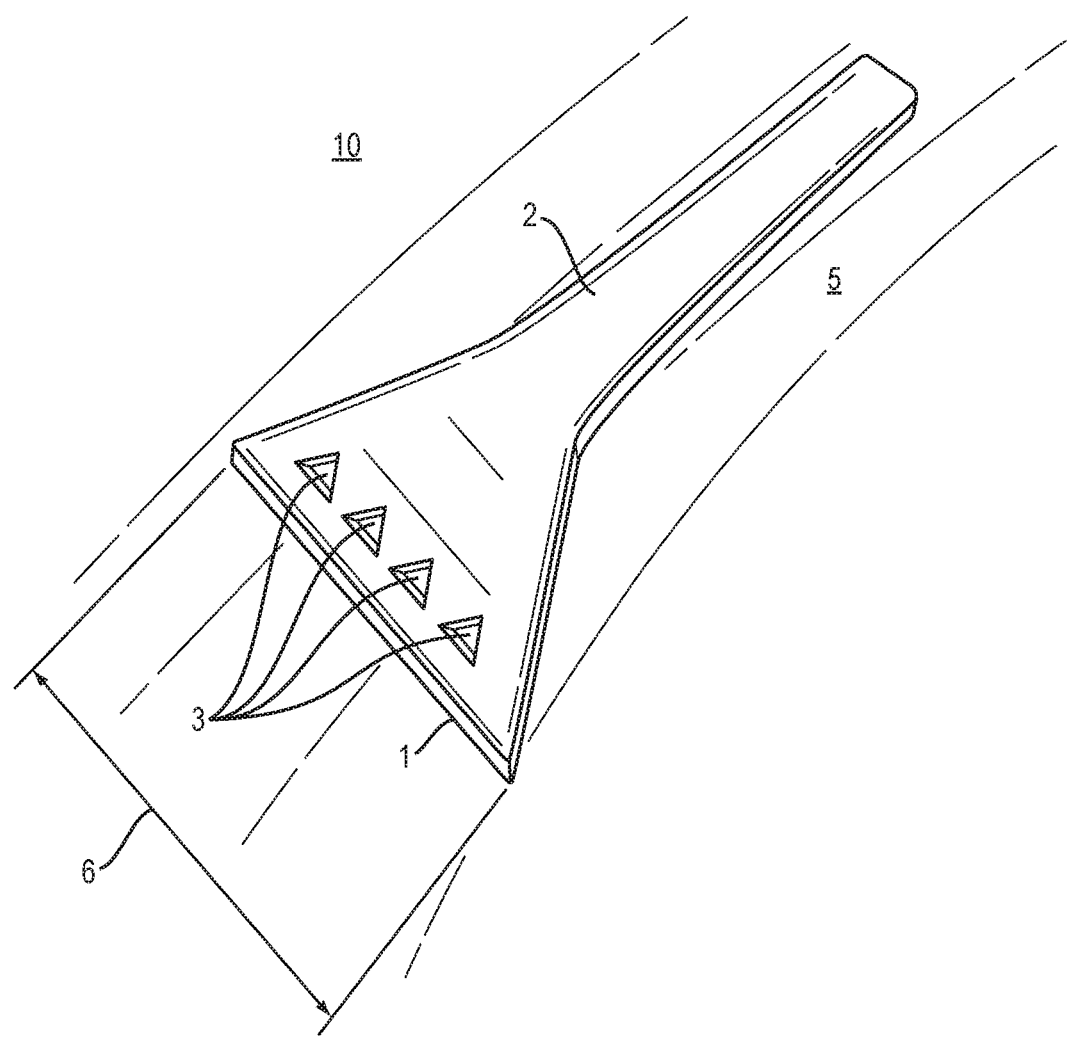
FIG. 1 is a perspective view of a prior art scraper

FIG. 1 shows a typical prior art ice scraper 10 used for removal of frozen material such as frost or ice from an environmentally exposed surface 5, such as automotive window glass. Frost removal edge 1 is a linear, continuous edge that is placed against the surface 5 (depicted in FIG. 1 as a series of curved lines representing a curved windshield surface) for frost removal. Handle 2 is held by a user such that scraper 10 is held at an angle with respect to the surface 5, and scraper 10 is moved forward along surface 5 to remove frost. Ice chipping features 3 form a discontinuous material removal edge and are configured to score channels into or chip ice that may be frozen on the window glass. Discontinuous material removal edges are ones that make intermittent contact over their span (the width extent) with a surface from which material is to be removed. Discontinuous edges such as toothed structures are useful for chipping, cracking and/or fracturing adhered materials such as ice. Scraper 10 must be flipped over from the orientation shown in FIG. 1 to chip or fracture ice using ice chipping features 3. Scraper 10 must be flipped back over to remove chipped ice from the surface with edge 1.

One drawback to prior art scrapers such as scraper 10 is that the angle with which scraper 10 is held with respect to surface 5 may vary. There is no mechanism to allow the user to stabilize the position in space of scraper 10 with respect to surface 5. As a result, scraper 10 may not be at an optimal angle for scraping and it can easily slip during use, resulting in an unexpected jerk movement or a user's hand hitting the surface.

Another drawback to the design of scraper 10 is that the frost removal edge 1 is straight (linear) while automotive vehicle glass is typically curved (and often curved in two dimensions) with a radius of curvature that typically varies over the glass surface, and that also varies with vehicle design. The contact line between the straight frost removal edge 1 and the curved glass surface 5 is necessarily narrower than the actual width 6 of the straight frost removal edge 1, thus necessitating more back and forth scraping action from the user to clear the window of frost, thus reducing efficiency of material removal.

Yet another drawback of prior art scraper 10 is that the user must apply a force "couple" in order to hold scraper 10 at an angle relative to the surface 5. That is, the user's hand must push down on a first portion while simultaneously pulling up on a second portion of scraper handle 2, in order to apply a force to surface 5 along the contact line of scraper 10 with surface 5. Requiring the user to apply a force couple (rather than a simple force) can cause excessive strain of the user's hand and wrist which is undesirable. Application of a force couple requires a user to use the small muscles of the hand and wrist to generate force to push scraper 10 against surface 5. Some users such as the elderly or those with a degree of arthritis may have difficulty applying sufficient force with their hands and wrists.

In order for a continuous material removal edge of a scraper to efficiently remove adhered material (such as frost, ice, coatings, paint or other adhered materials) from a curved surface such as vehicle window and windshield glass, the continuous material removal edge should be able to conform to the shape of the curved surface so that a wider section and ideally the entire width of the continuous material removal edge is in contact with the curved surface. In one non-limiting example, a scraper is constructed and arranged such that a continuous material removal edge incorporated therein can conform to the shape a surface from which material is to be removed, to efficiently remove material from the surface. It should be noted that it is not required though it may be beneficial for a discontinuous edge (typically in the form of teeth or a linear arrangement of protrusions) to closely conform to the underlying surface shape in order to fracture ice sufficiently to allow its removal from the surface.

In one non-limiting example, a scraper incorporates both a continuous material removal edge and a discontinuous material removal edge, the scraper constructed and arranged so that both edges simultaneously contact an underlying surface, where at least the continuous material removal edge is constructed and arranged to conform to the curvature of the surface from which material is to be removed. The continuous material removal edge in an unloaded state may be linear or may be pre-biased to have a curvature (either concave or convex). Pre-biasing continuous material removal edges is discussed in more detail in subsequent sections of this disclosure. The discontinuous material removal edge may also be constructed and arranged to conform to the curvature of the surface from which material is to be removed. The discontinuous edge may be in the form of teeth or an arrangement of protrusions from a surface.

In one non-limiting example, a scraper incorporates a pair of continuous material removal edges, where at least one continuous material removal edge is constructed and arranged to conform to the curvature of a surface from which material is to be removed. The second continuous material removal edge may also be constructed and arranged to conform to the curvature of the surface. Either one of, or both of the continuous material removal edges may be pre-biased into curved shapes in their unloaded condition.

In general, example scrapers disclosed herein are concerned with removing material from convex curved surfaces. However, the principles disclosed herein can also be applied to scrapers constructed and arranged to conform to curved concave surfaces. Examples constructed and arranged to conform to surfaces with concave curvature are discussed in more detail below in conjunction with an example scraper depicted in FIG. 2D.

In general, the example scrapers disclosed herein, except those scrapers disclosed as having elongated handles, are designed to be sufficiently compact such that they can easily fit in glove boxes and storage bins of automotive vehicles.

The input force supplied by a user to example scrapers disclosed herein is applied to a scraper handle and is transferred through the scraper structure to a continuous material removal edge. In one non-limiting example, the pressure applied between the continuous material removal edge and the curved surface at each point along the contact line of the continuous material removal edge with the surface exceeds a threshold pressure needed to remove the adhered material from the curved surface. The associated threshold pressure is a function of the material characteristics, the adhesion characteristics and the surface characteristics, and will vary with the details of the application. The pressure applied along the continuous material removal edge can be higher than the required threshold pressure. In general, it should not be lower than the threshold pressure or the material removal edge may not remove the adhered material at the point where the threshold pressure is not exceeded.

It has been found empirically that for typical scraping edges used to remove frozen material such as frost from vehicle window glass, a force greater than or equal to $F_{min}$ of approximately 10 N should be applied by the edge to the surface, so that threshold pressure for frost is exceeded. It has also been found empirically that a typical user is capable of generating a force $F_{max}$ of approximately 50 N to a scraper handle, when pressing the scraper against a surface with their arm extended. The minimum radius of curvature of typical automotive windows is 1.5 meters. For an automotive application, scrapers disclosed herein are constructed and arranged such that a continuous material removal edge is capable of conforming to a surface with a radius of curvature greater than or equal to 1.5 m, where a force greater than $F_{min}$ between the continuous material removal edge and the surface is obtained along the entire width of the continuous material removal edge, when the user applies a force to the handle less than or equal to $F_{max}$. The force $F_{min}$ should be exceeded everywhere along the continuous material removal edge, regardless of the curvature of the surface (that is, $F_{min}$ should be exceeded when the scraper is used on both curved and flat surfaces).

The differential deflection needed (maximum deflection anywhere along the edge minus minimum deflection anywhere along the edge) by the continuous material removal edge is a function of the edge width and the radius of curvature of the surface. As edge width increases, required differential deflection increases. As radius of curvature decreases, required differential deflection increases. In one non-limiting example, a scraper has a continuous material removal edge width greater than 100 mm, where the edge is constructed and arranged to conform to surfaces with radii of curvature greater than 1.5 m with less than 50 N of force applied by the user to the handle, while obtaining a force between the edge and the surface of at least 10 N over the entire width of the edge.

For efficient scraping, it is desirable for the entire length of a continuous material removal edge of a scraper to be in contact with a surface from which material is to be removed. In order for an initially linear continuous material removal edge to contact a curved surface over the entire length of the edge, the initially linear material removal edge must deform to conform to the shape of the curved surface, and must deform in a manner that obtains sufficient pressure along the entire portion of the continuous material removal edge in contact with the surface. For an automotive application, the continuous material removal edge of an ice scraper must be able to conform to the widely varying curvatures found in windows and windshields of a typical vehicle and between vehicle types.

Example scrapers disclosed herein distribute input force from a user's hand applied when grasping a scraper at a grip location to the material removal edge(s), and variably constrain displacement of one or more material removal edges along their widths in order to obtain material removal edges that conform to a wide range of surface curvatures (including flat). Example scrapers disclosed herein variably transform bending loads applied to a material removal edge into tension and compression loads in members affixed to material removal walls that incorporate the material removal edges, where the transformation from bending load to tension and compression load varies across the width of the material removal edge(s), to facilitate conforming the material removal edge(s) to the shape of the surface from which material is to be removed. The material removal edge(s) are deformed when a force pressing the scraper against the surface is applied by a user, so that the material removal edge(s) are placed into contact with the surface over their entire widths, while achieving a contact pressure that exceeds a required threshold contact pressure over the contact line of the material removal edge(s) with the surface.

It is desirable for the hardness of the material chosen to form the material removal edge(s) to be greater than the hardness of the material to be removed, but less than the hardness of the surface from which material is to be removed. By choosing a material for the material removal edges with a hardness within this range, the scraper will not scratch the surface from which material is to be removed, and the material to be removed will not scratch the scraper material removal edges. For the application of removing frozen material (frost, ice, etc.) from a vehicle windshield (where hardness of frozen material ranges around 1.5 Mohs, and hardness of vehicle glass is approx. 4.65 Mohs), non-limiting examples of polymer materials with a hardness that falls between the hardness of ice and the hardness of vehicle glass are ABS, polycarbonate, acrylic, and nylon. It should be noted that the listed materials are examples only and are not an exhaustive list of possible polymer materials. Numerous other polymer materials with similar hardness can be used.

In addition to polymer materials, many brasses also have a hardness that fits within the desired range for the application of removing frozen material from vehicle glass. For example, Cartridge Brass, UNS C26000 (260 Brass), H08 Temper flat brass has a Rockwell B hardness of 91 (see matWeb.com), which is approx. equivalent to a Mohs hardness of 3. Brass also has a higher Young's modulus than most polymer materials which allows thinner wall sections to be used without exceeding the yield limit of the material. When brass is used to form a continuous material removal edge, the continuous material removal edge demonstrates an improved ability to hold its edge over time compared to material removal edges formed from polymer materials.

Figure 2A:
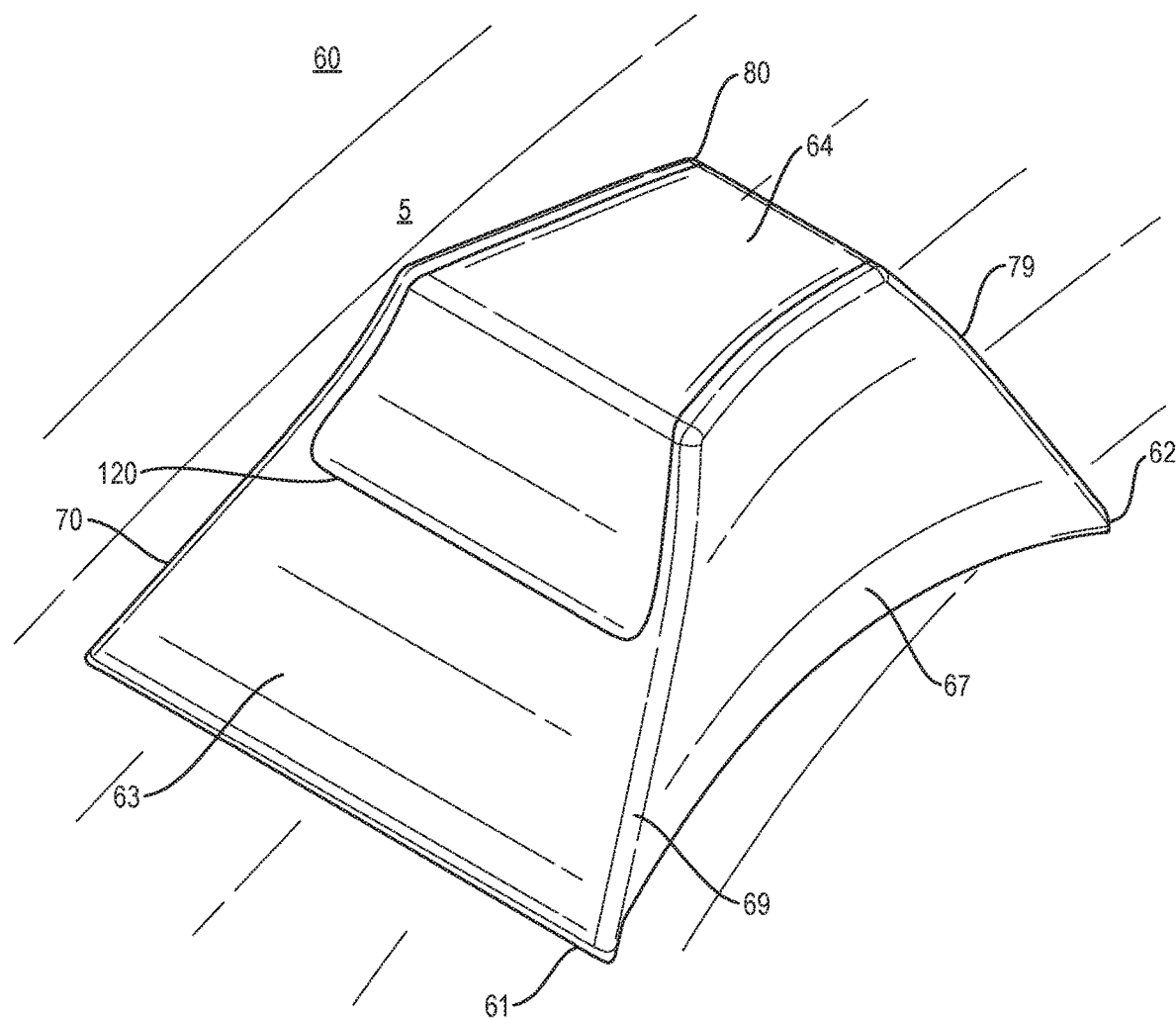
FIG. 2A is a perspective view on one example scraper.
Figure 2B:
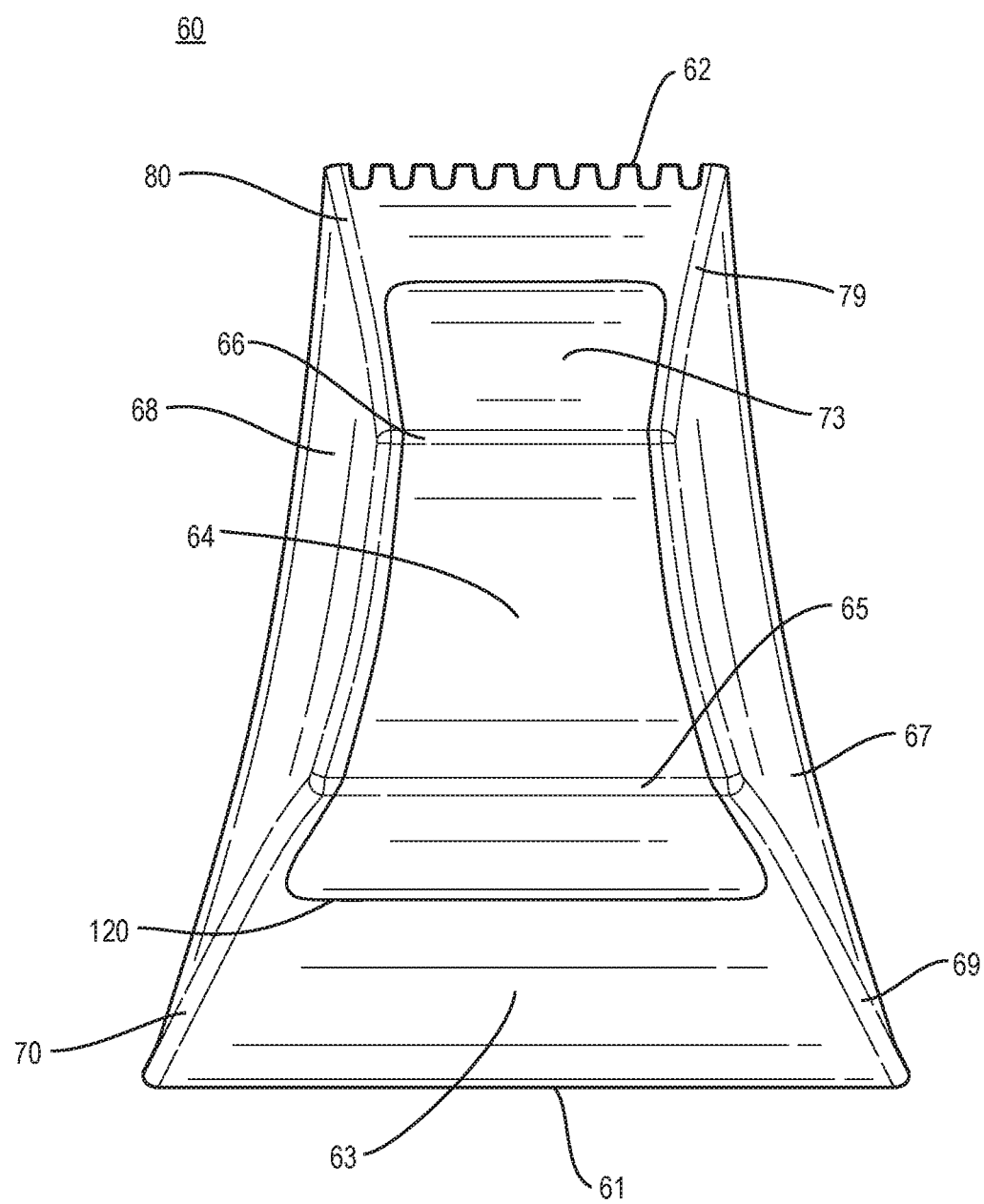
FIG. 2B is a top view of the example scraper depicted in FIG. 2A.

In one non-limiting example depicted in FIGS. 2A-2B, scraper 60 has two spaced apart material removal edges 61 and 62 (edge 62 is more clearly visible in the top view of FIG. 2B). Material removal edge 61 spans between ends 69 and 70 of material removal wall 63, and is linear and continuous in its un-deformed state (i.e. with no force applied by the user). Material removal edge 62 is a discontinuous toothed structure spanning between ends 79 and 80 of material removal wall 73, and is useful for chipping, fracturing and/or scoring channels in materials such as ice. Material removal edge 61 is located at one end of material removal wall 63. Side wall 67 couples between end 69 of material removal wall 63 and end 79 of material removal wall 73. Side wall 68 couples between end 70 of material removal wall 63 and end 80 of material removal wall 73. Side walls 67 and 68 also couple to side ends of handle 64. Side walls 67 and 68 are depicted as coupling to ends 69, 70, 79 and 80 of walls 63 and 73 over their entire lengths, though this is not required. Side walls 67 and 68 need only couple to portions of ends 69, 70, 79 and 80, and also need not couple to handle 64 at all. In order to control deformation of a material removal edge, it is sufficient for the side walls (or a single load transforming structure as depicted in FIG. 2D) to couple to the material removal wall near the location of the material removal edge. Side walls need not couple to the material removal wall over its entire height. In general, side walls should couple to material removal walls as close to material removal edges as is practical, to control deformation of the edges incorporated in the material removal walls, without interfering with the surface. Additional examples of side walls 67 and 68 are discussed in more detail below.

The side walls, truss structures, etc. disclosed herein couple to material removal walls to increase the bending stiffness of the material removal edge in the proximate region where the coupling occurs. The closer these structures couple to the edges, the greater their ability to alter the local bending stiffness of the edge. When coupling of such structures is described as "near" the material removal edge, it is meant that the coupling is sufficiently close to the edge such that the resulting variation in bending stiffness along the edge is sufficient to allow the edge to conform to a surface of interest with a force input to the scraper less than or equal to the maximum available force that can be applied by a typical user (maximum force is described elsewhere in this disclosure). In general, by nearer, it is meant that a side wall or truss structure should connect within a distance equal to at least ½ the height extent of material removal wall, and preferably within ¼ the height extent of material removal wall.

Bending loads are applied to continuous linear material removal edge 61 when scraper 60 is pressed against surface 5 by a user. The bending loads are transformed into tension and compression loads in side walls 67 and 68. The degree to which bending loads are transformed into tension and compression loads varies along the width of edge 61. It can be seen that the midpoint of the material removal edge 61 (midway between side walls 67 and 68) deforms in bending substantially more than the ends of the material removal edge 61 near where the load transforming structures 67 and 68 couple to the ends 69 and 70 of material removal wall 63. This behavior allows material removal edge 61 to conform to the curvature of a surface from which material is to be removed when the material removal edge 61 is pressed against the surface. In this example, the material removal edge 61 is constructed and arranged to deform to conform to convex surfaces.

It can be seen that handle 64 couples to walls 63 and 73 over the entire width of the tops of walls 63 and 73. Handle 64 spans the distance between side walls 67 and 68 and allows a user's hand to directly input force across the entire span (as opposed to the construction of some prior art devices that couple a handle to a material removal edge via spaced apart beams that connect the handle directly to ends of the material removal edge). The coupling of handle 64 to walls 63 and 73 over the entire span allows the user to control the force input to walls 63 and 73 across the width of the tops of walls 63 and 73. This construction allows a user's hand to rest on handle 64 while the user's fingers can rest on walls 63 or 73 (depending on the orientation in which scraper 60 is held). The user can distribute force applied to the handle 64 anywhere along the tops of walls 63 and 73, which aids in achieving sufficient pressure along the entire lengths of the material removal edges. In the non-limiting example scraper 60 depicted in FIGS. 2A and 2B, when scraper 60 sits with both material removal edges resting against the surface, handle 64 sits above the surface a distance sufficient to ensure the user's hand does not interfere with the surface, which in this example is approximately 50 mm.

It can be seen in the various figures (FIGS. 2A-C, F among others) that the shape of material removal wall 63 of scraper 60 (and scrapers 30 and 35 among others) has a slight concave curvature. This is beneficial as a user's hand can fit into this cupped shape. When scraper 60 is used to clear ice where edge 62 faces away from the user, the base of the user's hand rests on wall 63, the middle of the palm rests on handle 64, and the fingers rest on wall 37. When chipping ice, the scraper may need to be rammed into ice to crack it, and the cup shape of wall 63 helps hold the user's hand in place. In general, for example scrapers incorporating a pair of angled material removal walls incorporating material removal edges arranged so that both edges can contact a surface, where one of the material removal edges is discontinuous, the material removal wall opposite the discontinuous edge should have a concave curvature to better accommodate the base of a user's hand when chipping ice with the discontinuous edge.

The user can additionally input force to walls 63 or 73 directly by selectively using his or her fingers to press on walls 63 and 73, further contributing to the ability of the material removal edges to conform to the underlying surface curvature while providing sufficient pressure along the edges. By both coupling handle 64 to material removal walls 63 and 73 across the entire top span of walls 63 and 73, and allowing the user to use their fingers to input additional force to walls 63 or 73, it is possible to control the variation of force input by the user to the scraper over the width of scraper 60, and therefore control the variation of the distribution of the input force across the material removal edges. Variation of applied force across the width of material removal edges is controllable by the user by selectively using their fingers/hand to alter input forces across the width of the scraper. The variation of input force across the width is not solely predetermined by the construction of the scraper as in prior art devices. Example scrapers as disclosed herein provide for variably transforming bending loads input to a material removal edge (whether continuous or discontinuous) into tension and compression loads in transforming structures described in more detail in subsequent sections, as a function of location across the width of the material removal edge, while also providing the user the ability to selectively and controllably vary the input force applied to the scraper across of the width of the scraper.

Material removal wall 63 extends from continuous material removal edge 61 to the front edge 65 of handle 64, and between side ends 69 and 70. Material removal wall 73 extends from discontinuous material removal edge 62 to the rear end 66 of handle 64, between side ends 79 and 80. In one non-limiting example, material removal walls 63 and 73 are solid and continuous so that a user's fingers can rest on or push against walls 63 (or 73) when the palm of the user's hand rests on top of handle 64. In one non-limiting example, one of wall 63 and 73 incorporates one or more holes distributed in a manner such that a user's fingers can still exert a force against the wall. It should be noted that the terms "front" and "rear" used above to describe portions of handle 64 are relative terms only. Scraper 60 can be held and used such that either of material removal edges 61 and 62 is oriented towards the "front" and the other is oriented towards the "rear".

Continuous material removal edge 61 shown (in FIGS. 2A-2C) formed as an integral part of scraper 60, as may be done if scraper 60 is manufactured using an injection molding process. In one non-limiting example edge 75 (shown in FIG. 2F) is formed from a strip of brass (in one example stamped from sheet brass, in another example formed by skiving a roll of brass sheet material and cutting to length, and in another example formed as an extrusion) in inserted (either using an insert molding operation or inserting into a slot in a plastic part as a secondary operation) into wall 63 such that the brass strip extends over substantially all of the width of wall 63 and extends outward from the end of wall 63 a sufficient distance to allow an edge of the brass strip material to contact surfaces from which material is to be removed to act as the continuous material removal edge. Forming a continuous material removal edge from brass can provide substantial improvement over use of polymer materials. Brass strip material holds its edge better than typical polymer materials used for prior art scrapers, and provides improved scraping performance.

Discontinuous material removal edge 62 is shown as being formed as an integral part of scraper 60, as may be done if scraper 60 is manufactured using an injection molding process. Forming a discontinuous material removal edge from brass can provide substantial improvement over use of traditional polymer materials used in prior art scrapers. Discontinuous material removal edges formed of brass are discussed in more detail in a subsequent section with reference to FIG. 7.

Turning again to FIG. 2B top view of example scraper 60 shows handle 64 located between material removal edges 61 and 62 (projected locations of ends 65 and 66 of handle 64 sit inside projected locations of material removal edges 61 and 62). Projected locations are locations of an element projected onto a flat surface on which the scraper rests, with the scraper placed in its intended orientation for removing material from the flat surface where both material removal edges contact the surface. Handle 64 provides a surface on which a user's palm can rest while scraping, where handle 64 is arranged to be generally parallel to the surface from which material is to be removed when scraper 60 is in place against the surface with both material removal edges in contact with the surface. It should be noted that while handle 64 is described as being generally parallel to the surface, this should not be viewed as limiting as handle 64 may be arranged with a wide range of angles with respect to surface 5 when in place against surface 5, so long as a user applying a force directed towards surface 5 to handle 64 can effectively load both material removal edges when both material removal edges are in contact with surface 5.

When a user's hand rests on handle 64, the user's thumb may wrap around either side wall 67 or side wall 68 (depending on whether the user is right or left handed, and what orientation the scraper is being used in). A user's little finger may rest on the opposite side. Handle 64 should extend sufficiently above the surface when both material removal edges are in contact with the surface so that the user's thumb and little fingers can rest on the side walls without interfering with the surface. Side walls 67 and 68 may be solid which reduces the need for a side action in an injection molding tool used to manufacture scraper 60, or may be provided with an indentation or hole or ridge or other features to accommodate the user's thumb/finger for improved gripping (but may require a side action in tooling). The handle 64 and a portion of walls 63 and 73 form a gripping area, identified by outline 120, and may have a grip surface applied, such as by overmolding a soft touch elastomer material or affixing with adhesive a die cut piece of elastomer material to the grip area 120. If desired, soft touch material can also be extended around onto a portion of side walls 67 and 68.

It can be seen in FIG. 2A that the bottoms of side wall 67 (and the bottom of side wall 68 which is not visible in FIG. 2A) have a slight curvature. The bottoms of side walls 67 and 68 are curved sufficiently such that no part of the bottom of side walls 67 and 68 will contact surfaces of interest when scraper 60 sits against the surface with both material removal edges in contact with the surface. In an automotive application, scraper 60 is designed to accommodate surfaces with a minimum radius of curvature of 1.5 meters. However, this is a design choice that is primarily centered around a vehicle glass scraping application. The bottom of side walls 67 and 68 could be curved more than shown if it is required to remove material from surfaces with a smaller radius of curvature. Curving the bottom of side walls 67 and 68 does not appreciably affect their structural function for transforming bending loads applied to material removal edges and walls into tension and compression loads in the side walls (unless the curving is excessive, for example when the radii of curvature of the bottoms of the side walls is less than 4 times the distance between edges 61 and 62). In one non-limiting example (not shown) the side wall bottoms are straight, not curved as shown in FIG. 2A. A straight bottom wall is possible if the attachment point of the side walls to material removal walls 63 and 73 is displaced a sufficient distance away from material removal edges 61 and 62 to ensure the side wall bottom will not contact the surface when the scraper is pressed against the surface.

Scraper 60 (and other similar scrapers disclosed herein) is constructed such that in normal use, the pair of spaced apart material removal edges 61 and 62 simultaneously contact surface 5. By incorporating a pair of spaced apart material removal edges arranged for simultaneous contact with the surface, and providing a place between the pair of contact points with the surface (when viewed in a top view) for a user to apply a simple force, it is possible for scraper 60 to remain in a stable position on the surface while simultaneously orienting material removal edges at angles to the surface sufficient for effectively removing material. That is, the user is not required to apply a force couple (simultaneously pushing down on one part and pulling up on another part of the scraper) to hold scraper 60 against the surface with edges oriented at a proper angle for material removal, only a simple force is required. For example, if light snow were present on a window, a user could hold the scraper 60 against a window and move it back and forth to remove the snow using a single finger to keep scraper 60 in place against the window.

In some examples, such as the example scraper 60 of FIG. 2A-2B, the projected location of the center of mass of the scraper 60 (in top view) is located between the projected locations of the pair of material removal edges. Scrapers with elongated handles that may have a projected location of a center of mass sitting outside the projected locations of the material removal edges are described in subsequent sections.

Figure 2C:
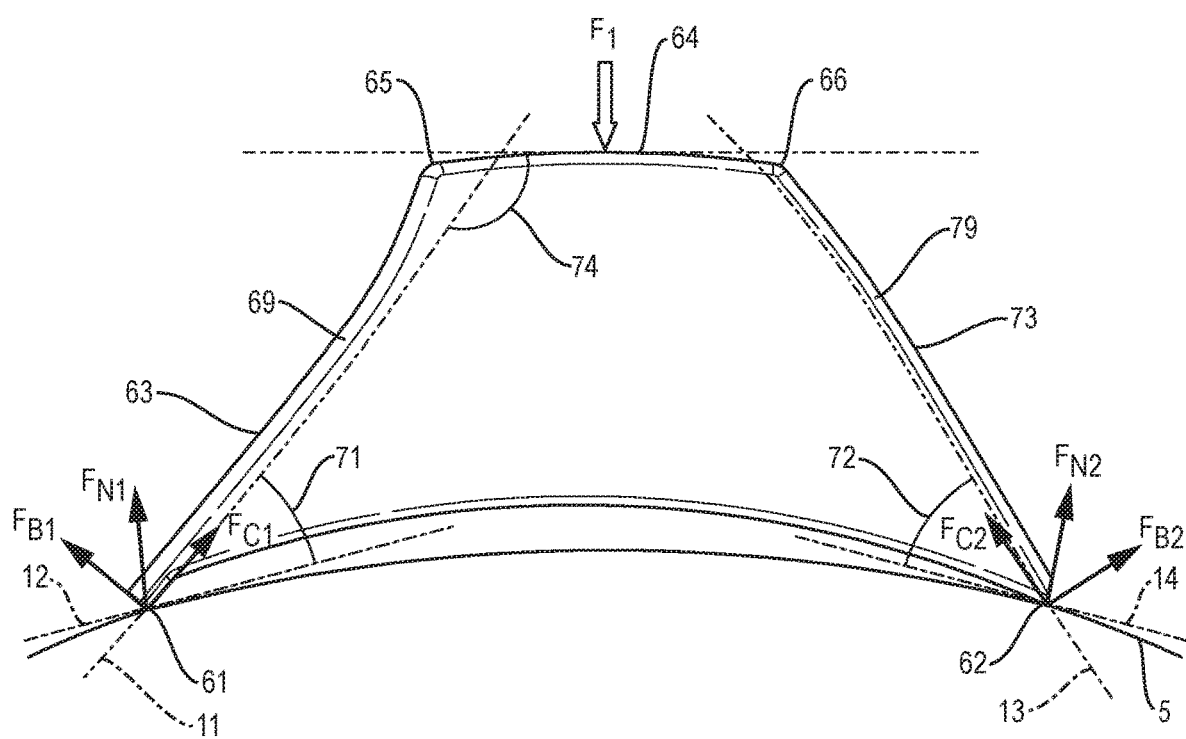
FIG. 2C is a side view of the example scraper depicted in FIG. 2A.
Figure 2D:
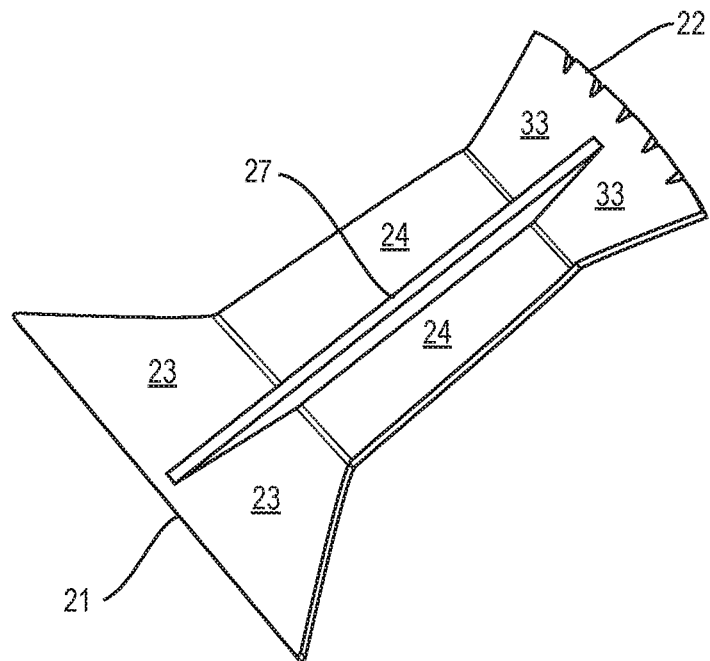
FIG. 2D is a view of the underside of an example scraper using a single truss structure.

FIG. 2C depicts a side view of scraper 60. Scraper 60 is constructed and arranged such that material removal walls 63 and 73 which incorporate material removal edges 61 and 62 are held at fixed angles 71 and 72 relative to the surface 5, when both material removal edges are in contact with surface 5. Angle 71 is the included angle between the plane of the material removal wall 63 (or a tangent plane through dotted axis 11 and the material removal edge 61 if wall 63 is curved in the side view of FIG. 2C) and a plane tangent to the surface 5 at the contact point of the material removal edge 61 with the surface (a plane through dotted axis 12 and material removal edge 61). Angle 72 is calculated in a similar fashion for material removal edge 62, and is the angle between a plane through dotted axis 13 and edge 62, and a plane through dotted axis 14 and edge 62. The fixed angles 71 and 72 are chosen to facilitate material removal from the surface. In one non-limiting example, angle 71 ranges between 10 and 80 degrees. In one non-limiting example, angle 71 ranges between 30 and 60 degrees. In one non-limiting example, angle 71 ranges between 40 and 50 degrees.

The angle 71 determines how the normal reaction force at the contact point of the material removal edge 61 with the surface 5 divides between in-plane and an out of plane (bending) components. As the angle 71 gets larger, the in-plane component increases and the out of plane bending component decreases. The in-plane component is related to how well the edge "digs in" to adhered material on the surface, and the out of plane bending component is related to how much the material removal wall deforms to conform to the shape of the surface. Having too much or not enough of either component results in an ineffective scraper (either one that doesn't conform to the shape of the surface or one that does but slides over adhered material instead of biting into it to dislodge it from the surface). The example scrapers disclosed herein maintain material removal walls at desired angles without requiring the user to do anything in particular to achieve it, as long as the two material removal edges are placed in contact with the surface.

Referring to FIG. 2C when a downward directed force $F_1$ is applied by a user to handle 64, normal reaction forces $F_{N1}$ and $F_{N2}$ appear at the contact point of material removal edges 61 and 62 with surface 5. These normal reaction forces can be decomposed into a pair of orthogonal force components, where $F_{C1}$ and $F_{C2}$ are components directed in the planes of walls 63 and 73, and $F_{B1}$ and $F_{B2}$ are components directed normal to the planes of walls 63 and 73. The in-plane force components $F_{C1}$ and $F_{C2}$ place walls 63 and 73 in compression. Since the walls are typically quite stiff in this direction, the in-plane force components cause little displacement of scraper walls 63 and 73. The in-plane force components are responsible for the scraper "digging in" to adhered material to remove it from a surface. The orthogonal, out of plane components $F_{B1}$ and $F_{B2}$ apply bending loads to walls 63 and 73 which are the loads of primary interest when trying to construct a scraper with a material removal edge that conforms to the curvature of an underlying surface from which material is to be removed.

The range of angle for a material removal wall incorporating a discontinuous material removal edge is not particularly limited, in part because conforming to the underlying surface curvature is less important for a discontinuous edge. As long as the discontinuous material removal edge is sufficiently stiff to resist damage when impacted with hard materials such as ice, it can work effectively to remove material.

Side walls 67 and 68 (discussed in more detail below) are constructed and arranged such that, if desired for some reason, the user's fingers can wrap around the bottom of the side walls to aid in holding scraper 60. Side walls 67 and 68 generally are less than 4 inches high and in one non-limiting example are less than 3 inches high. In example scraper 60 of FIG. 2A-2C, side walls 67 and 68, measured at the midpoint between material removal edges 61 and 62 are approx. 2 inches high, and the top surface of handle 64 rests approximately 2.5 inches above surface 5 when both edges 61 and 62 are in contact with surface 5.

Figure 3A:
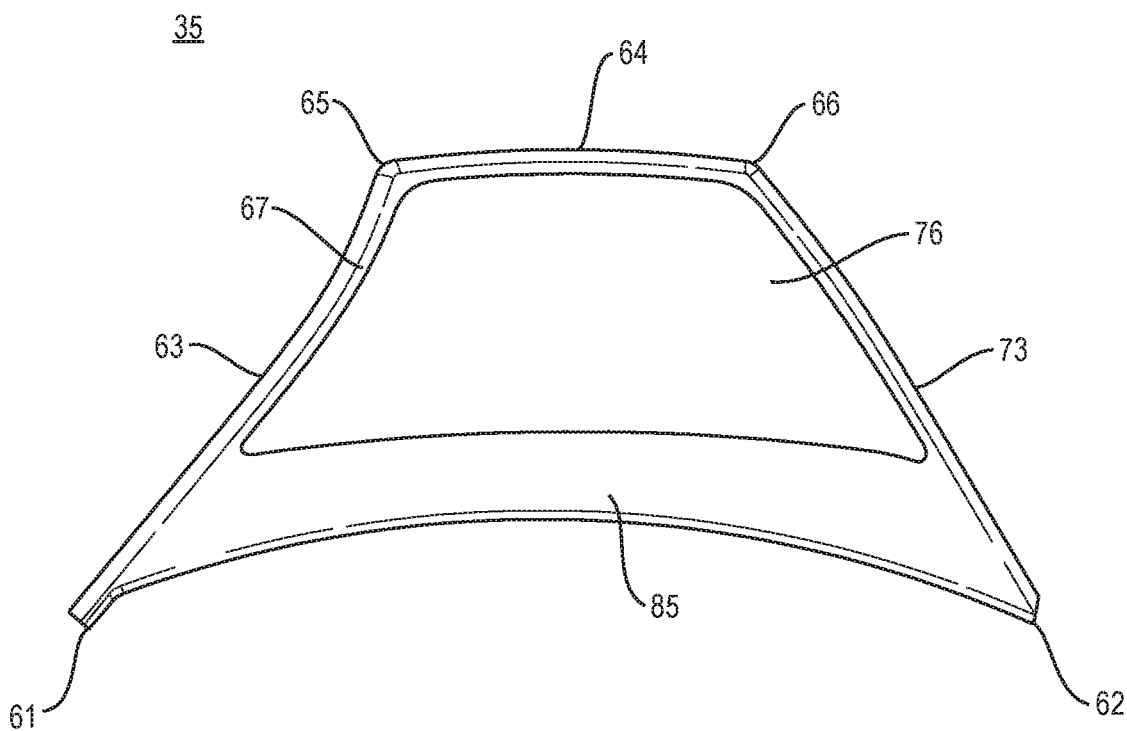
FIG. 3A is a side view of the example scraper depicted in FIG. 2A including an open truss panel.

In one non-limiting example shown in side view in FIG. 3A, side wall 67 and 68 (the opposite side of the scraper including side wall 68 has the same arrangement as shown in FIG. 3A for wall 67 except reversed left to right from what is shown) are not solid but have an opening therein. In this example, a user's fingers can wrap around the top of handle 64 and fit through open truss panel 76 in side wall 67 (and similar openings in opposite side wall 68 not shown). In one non-limiting example depicted in FIG. 3C, the opening in truss panel 76 only allows a user's thumb to partially press into the hole but not fit through it. This provides a good surface for enhancing grip of the scraper without the possibility of having fingers get caught within the interior of the scraper.

Figure 3B:
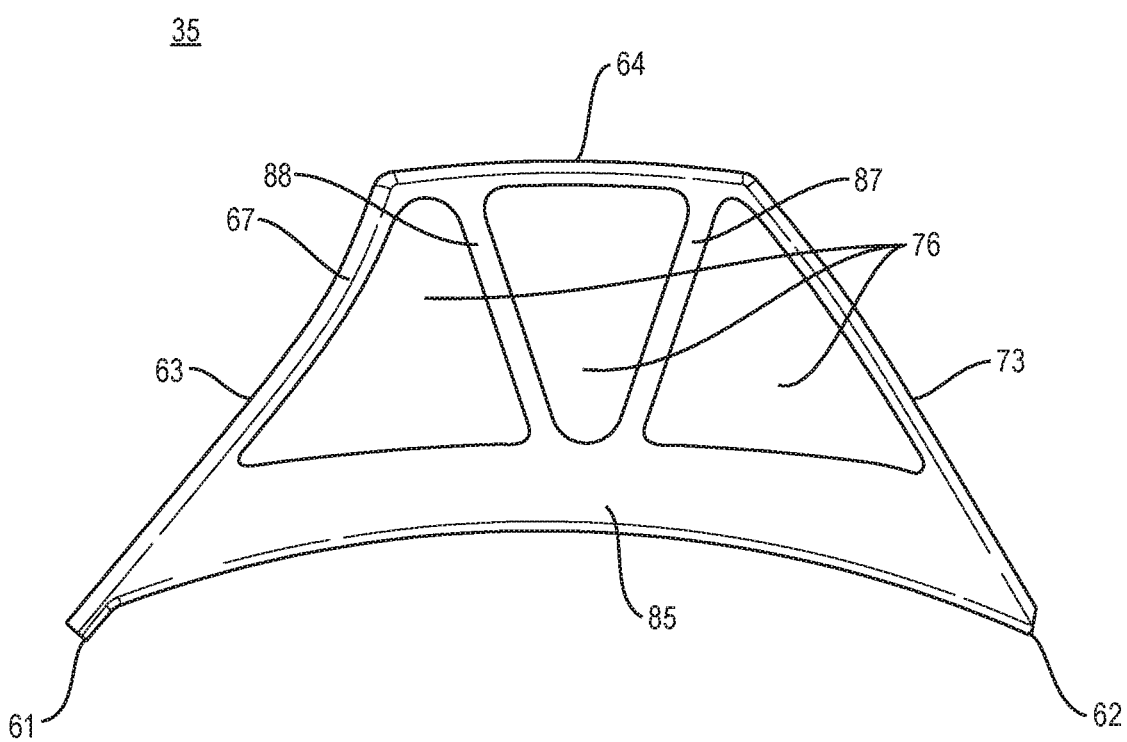
FIG. 3B is a side view of the example scraper depicted in FIG. 2A including an open truss panel and additional internal truss members.
Figure 3C:
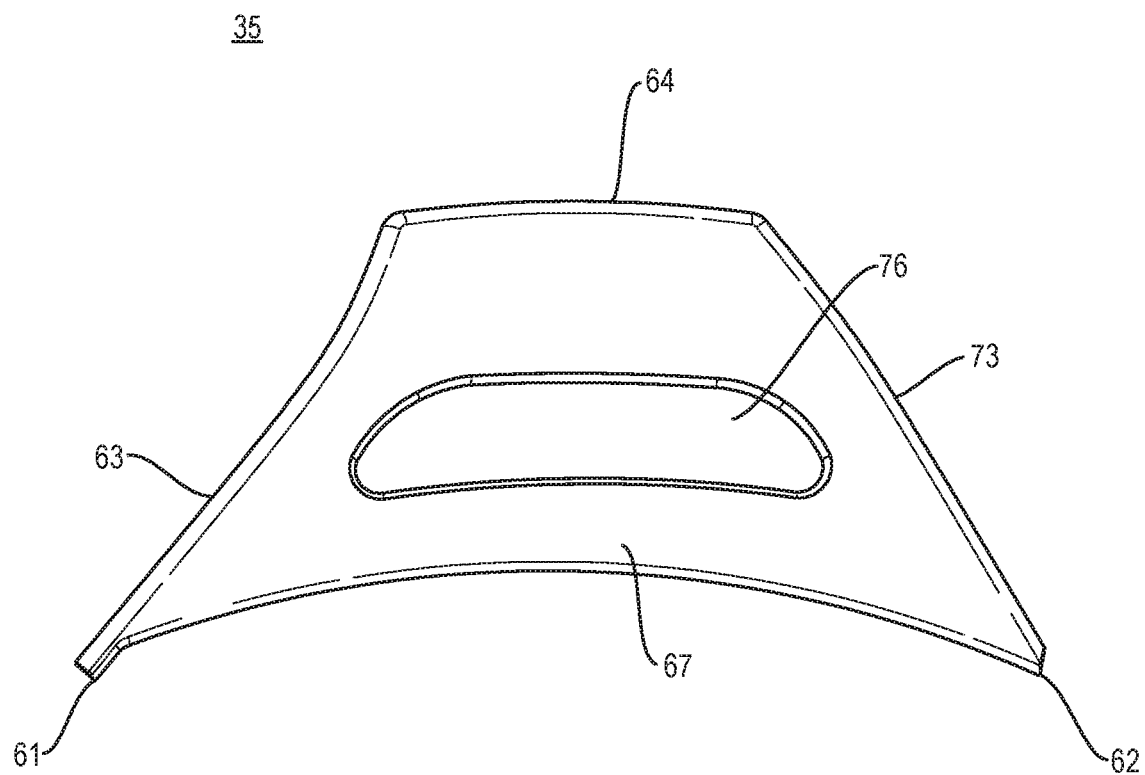
FIG. 3C is a side view of the example scraper depicted in FIG. 2A including a truss panel with a hole.

FIGS. 3A-3C depict alternative truss panels useable with the scraper of FIG. 2A. In scraper 35 of FIG. 3A, side wall 67 (and side wall 68) couple to ends of wall 63 over only a portion of the height of wall 63 that is nearer the continuous material removal edge 61 than it is to the handle 64. By nearer, it is meant that wall 67 (and 68) should connect within a distance equal to at least ½ the distance between the material removal edge and the leading edge 65 of handle 64 (i.e. ½ the height extent of material removal wall 63), and preferably within ¼ the distance between the material removal edge 61 and the leading edge 65 of handle 64 (i.e. ¼ the height extent of material removal wall 63). It is preferable for side walls 67 and 68 to couple to wall 63 as close as is practical to edge 61 to better control deformation of edge 61, without interfering with the surface from which material is being removed.

Side walls 67 and 68 effectively increase the bending stiffness and reduce displacement of the ends of material removal edge 61 (near where side walls 67 and 68 couple to ends 69 and 70 of wall 63) relative to displacement of the midpoint of material removal edge 61 (the point equidistant from the ends of material removal edge 61). The degree to which bending stiffness increases due to the coupling of side walls 67 and 68 to wall 63 depends on where the side walls 67 and 68 couple to wall 63 (how close to the material removal edge they are coupled), the side wall thicknesses (as this relates to the wall sectional modulus) and wall material properties, and how the side walls 67 and 68 couple to other portions of scraper 60. The coupling of side walls 67 and 68 to other portions of scraper 60 is discussed below.

As can be seen in FIGS. 2A-2B, side walls 67 and 68 couple to side ends 69 and 70 of wall 63 (which extends between handle 64 and continuous material removal edge 61), side ends of handle 64 and side ends 79 and 80 of wall 73 (where wall 73 extends between handle 64 and discontinuous material removal edge 62). By coupling walls 67 and 68 to either or both of handle 64 and wall 73, in addition to coupling to material removal wall 63, side walls 67 and 68 impart substantially larger bending stiffness to wall 63 along the material removal edge 61 near where side walls 67 and 68 couple to wall 63.

In scraper 60 of FIGS. 2A-B (and scrapers 30, 35 and other scrapers depicted in the figures), wall 63 forms an angle of approximately 45 degrees with surface 5 when both material removal edges 61 and 62 are in contact with surface 5, and handle 64 of scraper 60 is oriented at an angle of approximately 0 degrees (i.e. is generally parallel) to surface 5. If side walls 67 and 68 were coupled only between wall 63 and handle 64, side walls 67 and 68 would be tying between two generally planar walls that are angled with respect to each other approximately 135 degrees (shown as angle 74 in FIG. 2C), and would effectively form a truss structure having a generally triangular shape (when viewed from the side, one truss is formed by wall 63, handle 64, and side wall 67, and a second truss is formed by wall 63, handle 64, and side wall 68), which would substantially increases the bending stiffness seen along material removal edge 61 at the locations closest to where side walls 67 and 68 couple to wall 63. The angle formed between walls 67 (and 68) and handle 64 should be less than 165 degrees to obtain sufficient benefit from the truss structure, preferably less than 150 degrees.

If side walls 67 and 68 coupled to both walls 63 and wall 73, they would form a generally trapezoidal truss structure when viewed from the side (one truss is formed by wall 63, handle 64, wall 73, and side wall 67, and a second truss is formed by wall 63, handle 64, wall 73, and side wall 68). When side walls 67 and 68 couple between walls 63 and 73, the bending stiffness seen along the material removal edges 61 and 62 at the locations closest to where the side walls 67 and 68 couple to walls 63 and 73 is substantially increased, and is increased over the situation described above where the truss shapes were triangular. When the truss ties together walls 63 and 73, a substantial increase in bending stiffness is obtained whether or not side walls 67 and 68 couple to handle 64.

In the non-limiting example scraper 35 of FIG. 3A, handle 64 forms a top chord of a truss structure, walls 63 and 73 form angled members of the truss, and side wall connector 85 forms the bottom chord of the truss. Bottom chord 85 extends from wall 63 to wall 73, attaching to walls 63 and 73 on the side ends near the material removal edges 61 and 62. The area surrounded by the angled members (walls 63 and 73), the top chord (handle 64) and bottom chord 85 is the truss panel 76. In the example of FIG. 3A, truss panel 76 is depicted as being open. If desired, additional truss members could tie various portions of walls 63 and 73, handle 64 and bottom chord 85 together. In the non-limiting example scraper shown in FIG. 3B internal truss members 87 and 88 are added. It should be noted that although FIG. 3B shows two internal truss members, the arrangement and number of internal truss members is not limited.

The truss structures effectively transform bending loads applied to the truss into tension and compression loads in the truss members. When looking across the width of the material removal edges 61 and 62, the truss structures variably transform the bending loads $F_{B1}$ and $F_{B2}$ applied to walls 63 and 73 along material removal edges 61 and 62 into tension and compression loads in the truss elements (the chords and angled members). That is, looking across the width of the material removal edges, progressively more of the applied bending load present across the width due to a force applied to the scraper pressing it against the surface is converted into tension and compression loads in the trusses as the point of interest is moved from the midpoint of the material removal edges (i.e. midway between where sides walls 67 and 68 couple to walls 63 and 73, the point along the width at maximum distance from the location where the trusses couple to wall 63) towards the ends of the material removal edges nearer the location where side walls 67 and 68 couple to walls 63 and 73. This mechanism of variably transforming input bending loads into tension and compression loads as a function of location across the width of the material removal edges enables the material removal edges to conform to the curvature of the underlying surface.

Figure 4A:
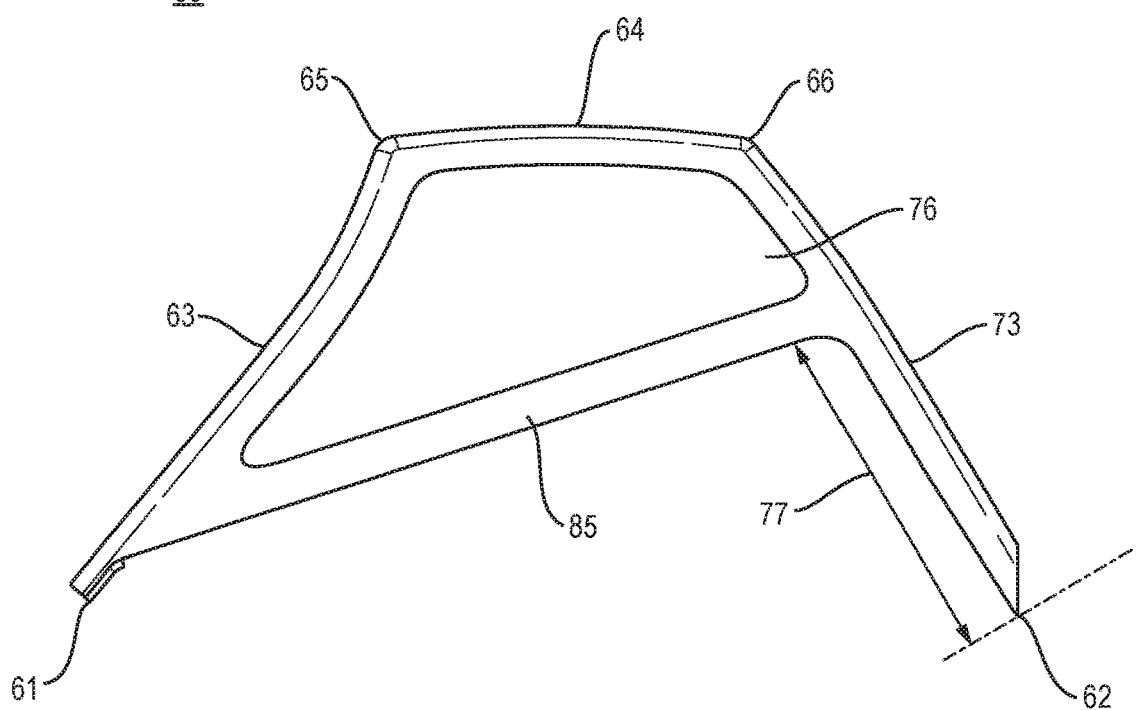
FIG. 4A is a side view of an example scraper with an alternative truss structure which also incorporates an open truss panel.
Figure 4B:
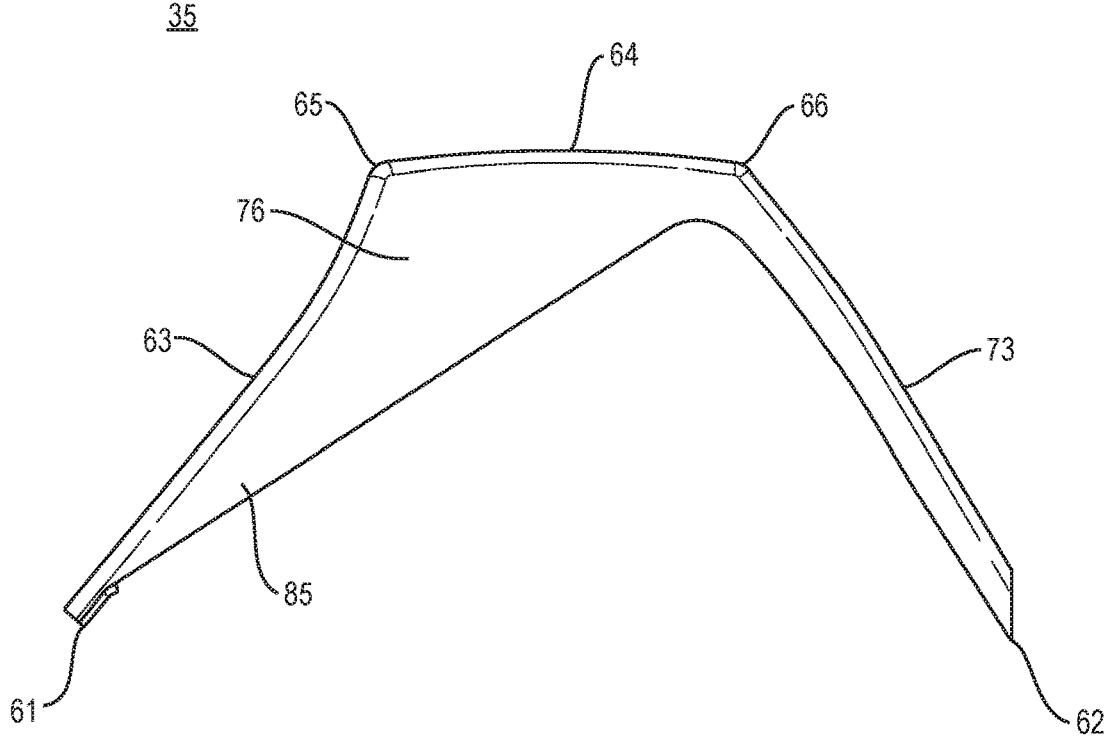
FIG. 4B is a side view an example scraper with an alternative truss structure which incorporates a solid triangular truss panel.

The examples depicted in FIGS. 4A and 4B show alternative truss structures that can be used with the scraper arrangement of FIG. 2A. In one non-limiting example depicted in FIG. 4A, chord 85 connects to wall 73 a distance (identified by ref. number 77 in FIG. 4A) away from the location of discontinuous material removal edge 62. (The opposite side of scraper 35 will have similar construction, just flipped left to right from what is shown in FIG. 4A.) The distance 77 is shown approximately ½ the height of wall 73. However, a practical device could connect bottom chord 85 to virtually any location along wall 73. The ability of the truss formed from wall 63, bottom chord 85, a portion of wall 73, and handle 64 to transform bending loads applied to continuous material removal edge 61 is not substantially altered as the distance 77 is varied. Even connecting bottom chord 85 at the joint 66 between handle 64 and wall 73 (shown in FIG. 4B with a different truss panel arrangement) will be effective in altering the bending behavior of edge 61, though the stiffness of wall 73 is reduced. Generally, it is preferable not to reduce stiffness of wall 73 appreciably, as edge 62 is subject to large impact forces when chipping ice.

As mentioned previously, it is not as important for a discontinuous material edge to be arranged to conform to the curvature of a surface from which material is to be removed because chipping or scoring channels in adhered material is not as sensitive to having the discontinuous material removal edge conform to the surface shape. It is also due to the fact that the wall 73 is typically made narrower than wall 63 (in order to keep the surface area of teeth small to maximize pressure when teeth are pressed against harder materials such as ice). As the span of the discontinuous material removal wall narrows, a linear discontinuous edge is a closer approximation to the curved shape of the surface.

Turning now to FIG. 4B, a side view of one side of non-limiting example scraper 35 is shown. (The opposite side of scraper 35 will have similar construction, just flipped left to right from what is shown in FIG. 4B.) Bottom chord 85 is connected between wall 63 and the region of joint 66 between handle 64 and wall 73 and truss panel 76 is solid. It should also be noted that in either of the examples of FIG. 4A or FIG. 4B, the truss panel 76 could be open or closed, or could be constructed with internal angled members as described earlier with respect to the example of FIG. 3B. In FIG. 4B, since the truss panel is solid, the bottom chord and truss panel connect along essentially the entire length of wall 63 (except right at the material removal edge where some clearance is provided) and along the length of handle 64. The coupling of walls 67 (and 68) with wall 63 and handle 64 forms a triangular shaped truss structure, where wall 63 and handle 64 and bottom chord 85 provide angled members of the truss. The truss structure will act to transform bending loads applied to material removal wall 63 along material removal edge 61 into tension and compression loads as before, and will variably constrain bending of wall 63 over the width of wall 63. This arrangement will substantially reduce outward displacement of material removal edge 61 at locations proximate the location where side walls 67 (and 68), and more specifically bottom chord 85 (and its equivalent in the opposite side wall 68), couple to wall 63, compared to the outward displacement of edge 61 obtained between the locations of side wall coupling, when a downward directed force is applied by a user to handle 64 that forces scraper 60 against the surface.

In one non-limiting example, a scraper is configured in a manner similar to scraper 60 of FIG. 2A, but both material removal edges 61 and 62 are of the continuous type. By incorporating a pair of continuous material removal edges, with each arranged so that the included angle formed between the material removal wall containing the material removal edge and the surface at the point the material removal edge contacts the surface is an effective angle for scraping (such as between 30 and 60 degrees as described earlier for the scraper having one continuous and one discontinuous edge), provides for yet more efficient scraping for certain types of adhered materials, one example being frost. As the scraper is moved fore and aft across a surface, each edge will alternatively be arranged for effective scraping to allow efficient material removal for both fore directed motions and aft directed motions (motions away from and back towards the user). Material removal walls are maintained at desired angles for scraping, and the dual edge design enables scraping by a user while only requiring application of a simple force.

The example scraper as shown in FIG. 2A incorporates a first continuous material removal edge and a second discontinuous material removal edge. The scraper can be moved in a first direction to score channels in ice using the discontinuous material removal edge. When scraper 60 is held with the material removal edge 62 facing away from a user and the user pushes the scraper away from their body, material removal edge 62 contacts the hard material (such as ice in an automotive application) on the surface before material removal edge 61 contacts the material. Discontinuous material removal edge 62 first breaks up the material on the surface and continuous material removal edge 61 follows behind "in the same motion" to clean up the surface. No flipping back and forth between continuous and discontinuous edges is needed. Removal of harder materials such as ice becomes much more efficient. In prior art scrapers, one must hold the scraper in a first orientation to score channels in or chip ice using a discontinuous material removal edge. Once the material has been chipped or scored, the user flips the scraper over to a second orientation and to re-scrape all the areas previously scraped using a continuous material removal edge.

The example scrapers disclosed herein inherently reduce or eliminate hand and wrist strain, and are much less prone to slipping and abrupt orientation changes when chipping ice due to their inherently stable design. When a user holds a traditional scraper (which requires application of a force couple to hold the scraper at an effective scraping angle), when the scraper is jammed into ice substantial strain may occur in the user's hand and wrist (from abrupt stopping and torque generation when impacting thick, hard material such as ice). The scraper may also suddenly change its orientation as it either breaks through ice or slips over the ice surface, which can result in scraped knuckles for the user.

Analysis of a computer finite element model of scraper 60 of FIG. 2A (but using the side panel construction depicted in FIG. 2F) was performed. The material properties, dimensions and geometry of the modeled scraper were chosen to enable continuous material removal edge 61 to conform to a curved surface with a radius of curvature of approximately 1.5 meters (1.5 meters is the smallest expected radius of curvature of vehicle glass), with an input force applied by a user in the range between 5 and 10 lbs. of force. The model assumed use of ABS material with 3 mm wall thickness, the width of the continuous material removal edge 61 was chosen to be 110 mm, material walls 63 and 73 were each angled at 45 degrees relative to a flat surface, the overall height of scraper 60 above the surface was chosen to be 50 mm, and the spacing between material removal edge 61 and 62 was chosen to be 120 mm. For ease of modeling, the handle 64 was fixed and an input force of 10 lbs. was applied. The force was directed upward, normal to the surface and distributed across material removal edge 61. Application of the force resulted in deflection of the center of material removal edge 61 of approx. 1.5 mm relative to deflection of the ends of the material removal edge 61. In other words, the differential deflection obtained for the material removal edge, which is the difference between the maximum and minimum deflection of the edge over its length, was 1.5 mm. The height of an arc with a radius of 1.5 meters over a span of 110 mm is approx. 1 mm. Therefore, with 10 lbs. of force applied the example scraper model shows it will deflect sufficiently for it to conform to the 1.5 meter radius of curvature.

In the above example, the distance between material removal edges 61 and 62 was chosen to be 120 mm. Examples are not limited to this spacing. Spacing larger than or smaller than 120 mm are contemplated herein. In one non-limiting example, the spacing is equal to or greater than 70 mm. In one non-limiting example, the spacing is equal to or greater than 100 mm. In one non-limiting example, the spacing is equal to or greater than 120 mm. In one non-limiting example, the spacing is equal to or greater than 150 mm. In one example, the spacing is equal to or greater than 200 mm. In one non-limiting example, the spacing is equal to or greater than 300 mm. For spacing larger than approx. 150 mm, it may be desirable to add stiffening ribs to sections of the scraper that are not intended to deform, such as handle 64. Stiffening ribs can also be added to portions of walls 63 and 73, but should not extend too close to the material removal edges or they could cause the bending stiffness of portions of the material removal edges to increase in undesirable ways.

In one non-limiting example depicted in FIG. 2D, single structure 27 transforms bending loads applied to continuous material removal edge 21 (and discontinuous material removal edge 22) into tension and compression loads in the structure 27. Though scraper 20 is depicted as having a continuous and a discontinuous edge, use of a pair of continuous material removal edges is also contemplated. Additionally, either or both of the edges may be pre-biased into curved shapes with the same or different radii of curvature, with either concave or convex shapes in unloaded conditions. Scraper 20 is configured to deform to conform to surfaces with a concave shape. The ends of material removal edges 21 and 22 deform substantially more than the midpoints. Scraper 20 is depicted flipped upside down from the orientation of scraper 60 in FIG. 2A.

Structure 27 is coupled to the midpoint of material removal wall 23 of scraper 20. Structure 27 couples to wall 23 over essentially its entire height, though coupling over the entire height is not required. Structure 27 also couples to the midpoint of material removal wall 33 over essentially its entire height, though coupling over the entire height is not required. Structure 27 is shown coupled to material removal wall 23 near the continuous material removal edge 21 and to wall 33 near material removal wall 33. In one non-limiting example, structure 27 couples to walls 23 and 33 as close as practical to edges 21 and 22 so as not to touch curved surface 5. Structure 27 also couples to handle 24. However, coupling to handle 24 is not required.

Structure 27 can effectively transform bending loads applied to edges 21 and 22 into tension and compression loads if it is only coupled to walls 23 and 33. Alternatively, structure 27 can transform bending loads applied to edge 21 into tension and compression loads if it is only coupled to wall 23 and handle 24. Structure 27 need not couple to wall 33 near the location of discontinuous material removal edge 22 if it is only necessary to transform bending loads applied to material removal edge 21 into tension and compression loads (that is, only edge 21 is desired to conform to the underlying surface curvature). In this case, structure 27 could be coupled to any portion of wall 33. If it is desired for discontinuous material edge 22 to also conform to a concave surface, then structure 27 should couple to wall 33 near the location of material removal edge 22, as shown, but sufficiently far away from the edge so as not to contact surface 5.

Figure 2E:
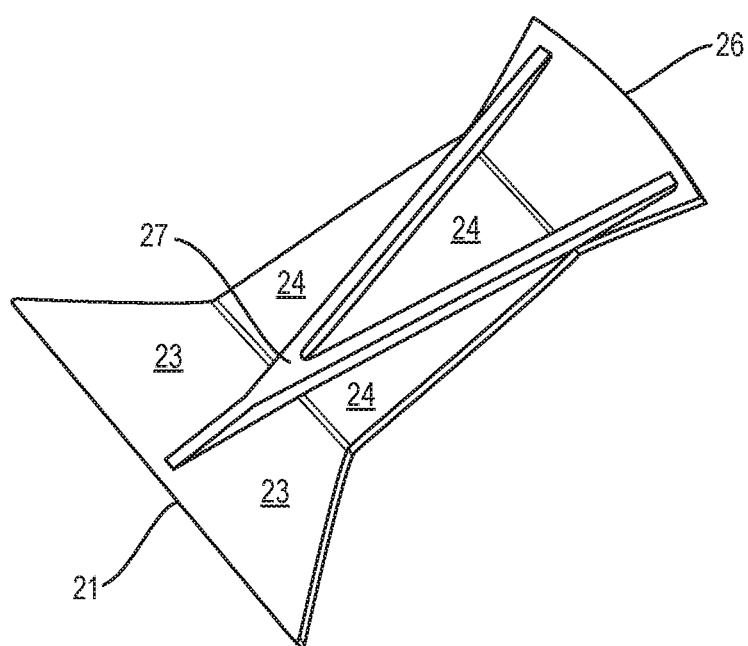
FIG. 2E is a view of the underside of an example scraper using an alternative truss structure.

In one non-limiting example depicted in FIG. 2E, scraper 29 incorporates a pair of continuous linear material removal edges 21 and 26. Edge 21 is arranged so as to conform to a surface with concave curvature, and edge 26 is arranged to conform to a surface with convex curvature. Although material removal edges 21 and 26 are both depicted as being continuous and linear, either of material removal edges 21 and 26 could be configured as discontinuous material removal edges, and either edge could be configured to conform to concave or convex surfaces by reversing the connection of structure 27. Additionally, either or both of the edges may be pre-biased into curved shapes with the same or different radii of curvature, into either concave or convex shapes in unloaded conditions. Structure 27 couples to wall 23 near the location of material removal edge 21, near the midpoint of edge 21, and also couples to wall 33 near material removal edge 26, near the ends of edge 26. Structure 27 may but need not couple directly to handle 24, and may but need not connect to walls 23 and 33 over their entire extent. It is sufficient for structure 27 to only couple to walls 23 and 33 over portions of walls 23 and 33 near the material removal edges 21 and 26. Preferably, structure 27 couples as close as practical to material removal edges, without interference by the surface, for whichever of walls 23 and 33 are desired to conform to the curvature of the underlying surface.

Figure 2F:
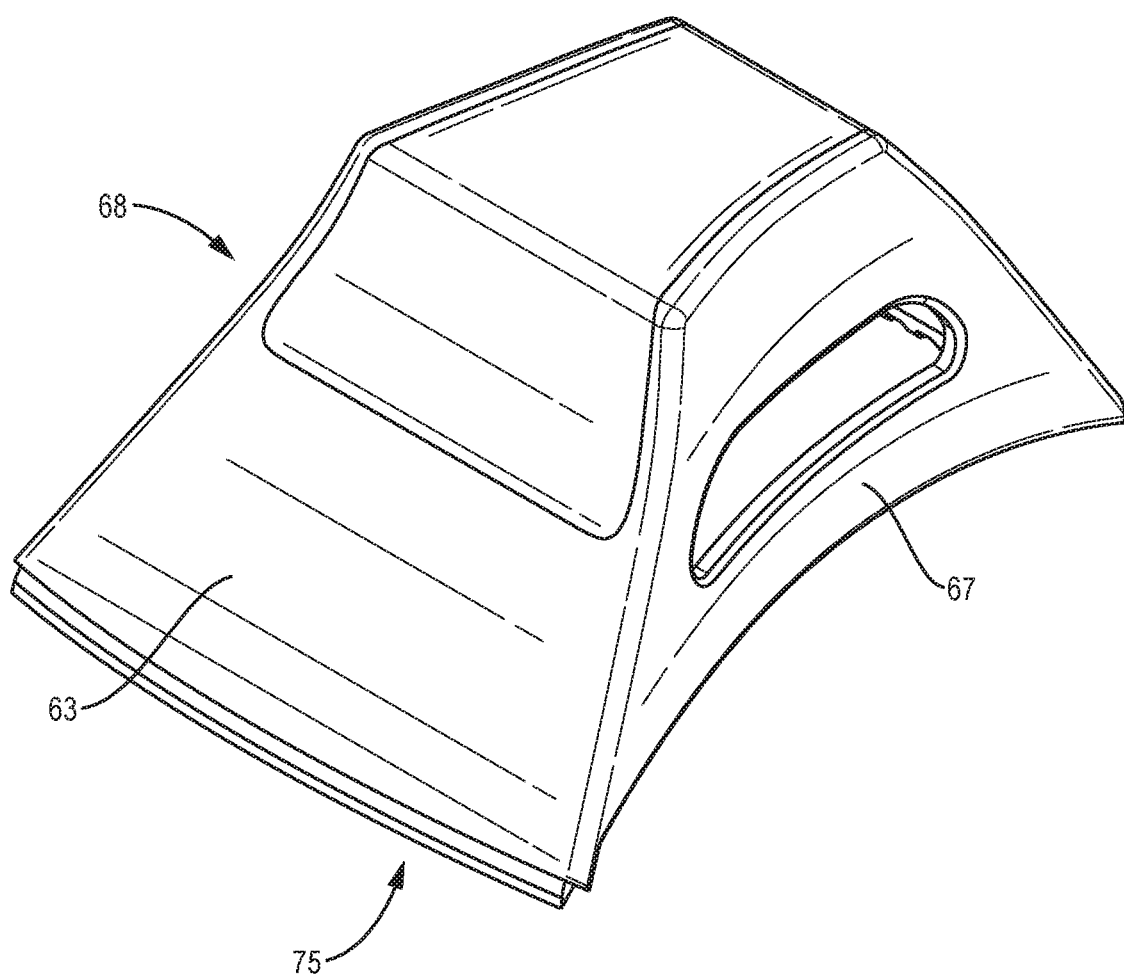
FIG. 2F is a perspective view of another example scraper including a continuous material removal edge pre-biased into a concave curved shape.

In one non-limiting example depicted in FIG. 2F, scraper 30 incorporates a continuous material removal edge 75 which is pre-biased to have a curved shape in its unloaded condition. Edge 75 in this case is formed from a strip or brass that is insert molded into the housing of scraper 30. Scraper 30 is similar to scraper 60 of FIG. 2A, except that the truss panel 76 has an opening therethrough, and the continuous material removal edge 75 is pre-biased into a curved shape. Pre-biasing can be useful to alter the pressure applied to a surface along the contact line of the continuous material removal edge with the surface, and to accommodate a wider variety of surface curvatures. In any of the example scrapers described herein, a continuous material removal edge having some degree of curvature in an un-loaded state could be used. By pre-biasing a continuous material removal edge to have a curved shape in its un-loaded condition, it is possible to construct a material removal edge that can conform to convex, flat and concave surfaces.

Example scraper 30 of FIG. 2F incorporates bending load transforming structures 67 and 68 (68 is on opposite side of scraper 60 from side 67, and is not visible in FIG. 2F) attached to ends of material removal wall 63 incorporating material removal edge 61. Edge 61 and at least a portion of wall 63 proximate edge 61 of scraper 30 is pre-biased to have concave curvature in an unloaded state. Such a pre-biased edge/wall could conform to any concave shaped surface with a radius of curvature greater than the radius of curvature of the un-deformed edge 75, as well as a range of convex curved surfaces, when scraper 30 is pressed against such curved surfaces. The material removal edge 75 in this case is biased such that the midpoint of the edge (which is the location along the edge that can be maximally deformed with applied bending loads) contacts a surface from which material is to be removed first, for surfaces of interest.

In one non-limiting example, a scraper has a removable blade assembly where the removable blade assembly incorporates either a pair of continuous material removal edges or a first continuous material removal edge and a second discontinuous material removal edge. Example removable blade assemblies are shown in FIGS. 5A-5E. Removable blades are useful for scrapers as they allow a blade to be replaced if it is damaged without having to replace the entire scraper. Injection molded removable blades can be manufactured at low cost.

In one non-limiting example, a continuous material removal edge (or edges) of a removable blade are constrained to provide variable displacement of the continuous material removal edge or edges over their respective widths (although a discontinuous material removal edge if incorporated in the removable blade may also be so constrained if desired). The removable blade incorporates structures that variably transform bending loads applied across the material removal edge(s) into tension and compression loads in the structures, to vary the bending stiffness of the material removal edges over their respective widths. Structures can be incorporated in removable blades so that material removal edges can deform to conform to either convex or concave surfaces, or both. Example scrapers incorporating removable blades are discussed in more detail in subsequent sections.

Removable blade assemblies can be configured similarly to the configurations of scrapers described earlier, with the one exception that handle 64 of FIG. 2A is replaced with top surface 54 that couples the material removal walls together. In most applications, top surface 54 will be smaller than handle 64 as the scraper will have a separate handle. A force applied by a user to the scraper handle can be distributed across the entire width of the blade top surface 54. This aids in more evenly distributing the input force across the entire width of the material removal edges. In some examples, a replaceable blade assembly can be made similar to earlier described scrapers (such as scrapers 20, 29, 30, 35, and 60) but including features that allow the blade assembly to removably connect with a separate scraper handle. Top surface 54 may include coupling features useful for securing the removable blade to a separate handle structure of some type.

Removable blade assemblies incorporate a pair of material removal walls which each incorporate a material removal edge. The pair of material removal edges are spaced apart from each other. The material removal edges can be any of the material removal edge types described earlier (continuous or discontinuous, linear or pre-biased into a curve), where at least continuous material removal edges are constructed and arranged to conform to the curvature of an underlying surface (which can be convex, concave, or flat).

There are numerous ways in which a removable blade assembly can be attached to a scraper body or handle. In some examples, the removable blade assembly snaps into a handle, in other examples it slides into place in the handle, or it may use clips, threaded fasteners, or other known fastening methods. Holes 59 are shown in FIGS. 5A and 5B which can be used to couple with snap features of a separate scraper handle providing one coupling method, but examples disclosed herein are not limited in the coupling features used to secure removable blade assemblies to scraper handles.

The scraper handle and removable blade assembly are arranged such that a force applied to the handle to force the removable blade against a surface is transferred to the top region 54 of the removable blade assembly located between the pair material removal edges, so that both material removal edges can simultaneously be loaded against the surface. Structures, such as ridges, walls, or other mechanical stops can be incorporated into either the removable blade assembly, scraper body, or both to absorb fore-aft loads and torque loads that may be generated when the scraper impacts harder materials when scraping the surface, so that snap or coupling features that affix the blade assembly to the handle do not need to withstand the impact loads. In one non-limiting example, structures separate from attachment features that couple the blade assembly to the scraper handle protrude from the scraper handle and fit through one or more holes 59 or slots in the top surface of a removable blade, to absorb fore-aft loads and torques. The holes can also be used as alignment features for assembly of the blade to the scraper body, and may also be used to alter the bending stiffness of the material removal walls of the removable blade. In one non-limiting example, the removable blade assembly slides in place between walls in the scraper body that absorb fore aft loads and torques.

Figure 5A:
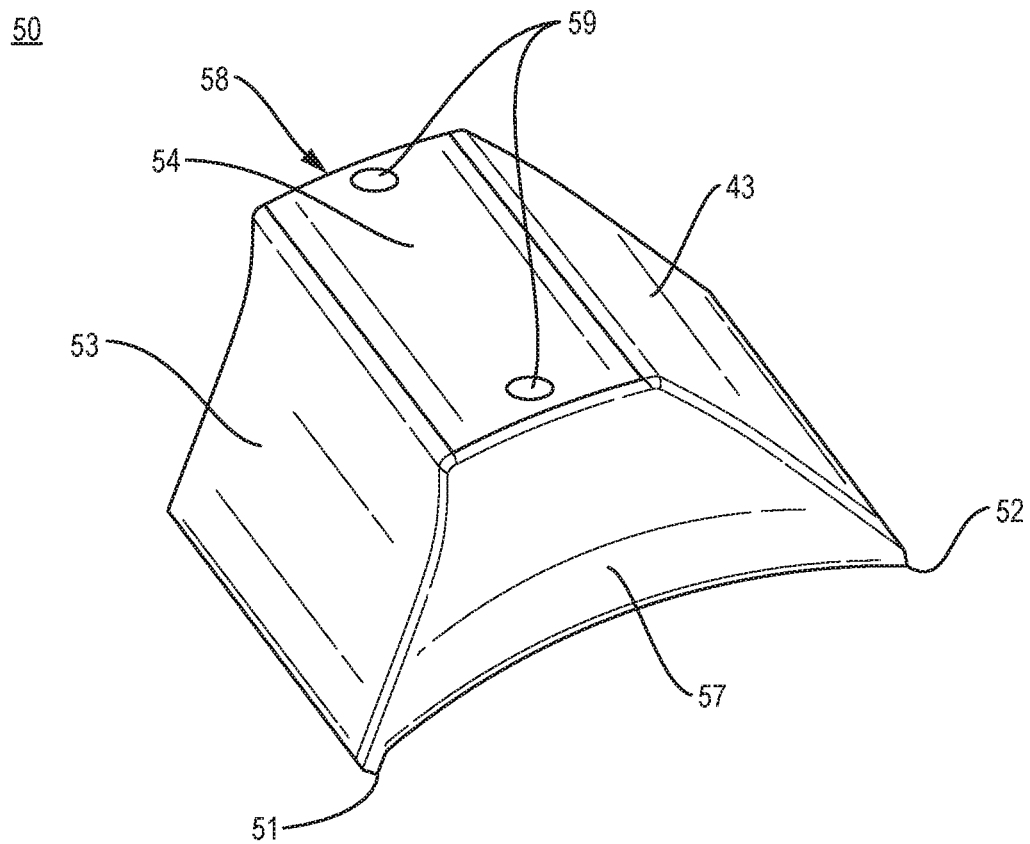
FIG. 5A is a perspective top view of a removable scraper blade assembly.
Figure 5B:
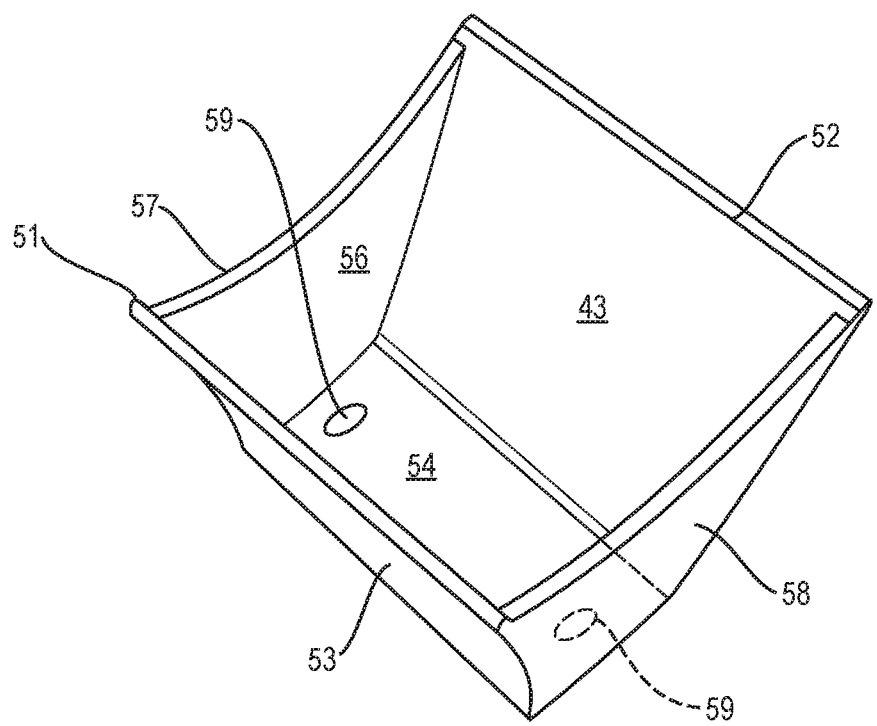
FIG. 5B is a perspective bottom view of a removable scraper blade assembly.

Removable blade assembly 50 incorporates a pair of continuous material removal edges 51 and 52, as shown in FIGS. 5A and 5B. The view shown in FIG. 5B is flipped over from the view shown in FIG. 5A, to show the interior surfaces of removable blade 50. Side walls 57 and 58 connect ends of material removal walls 53 and 43 to each other at least at locations near the material removal edges. Preferably, side walls 57 and 58 couple to material removal walls 43 and 53 as close as is practical to material removal edges 51 and 52 without interfering with the surface from which material is to be removed, for whichever of the edges are constructed and arranged to conform to the curvature of the surface when pressed against it.

Side walls 57 and 58 are depicted as solid and are attached to walls 53 and 43 along the entire height of material removal walls 53 and 43 (except some clearance is provided near the material removal edges), at opposite ends of blade assembly 50. When viewed from the sides trapezoidal shaped truss structures are formed, where side walls 57 and 58 form the bottom chords and panels of the truss structures, blade top surface 54 forms the top chord (which is analogous to the role handle 64 performs in the example scrapers of FIGS. 2A-2C, 3A-4B), and material removal walls 53 and 43 form angled members of the truss structures. Though side walls 57 and 58 (58 not visible in FIG. 5A) are depicted as having solid panels, any of the previously described truss panels can be used with the replaceable blade assemblies, such the truss panels shown in FIGS. 3A-3C.

The truss structures variably transform bending loads applied to the material removal edges 51 and 52 into tension and compression loads in the truss structures, where the degree to which bending loads are transformed into tension and compression loads varies as a function of location along the material removal edges, with relatively more bending load transformed into compression and tension loads as the location of interest along the material removal edges gets closer to the points where the side walls 57 and 58 couple to the material removal walls 53 and 43.

The material removal edges of removable blade assembly 50 will conform to a surface with convex curvature when a force is applied that loads blade assembly 50 against the surface, with both edges 51 and 52 against the surface. The edges of blade assembly 50 will deform in the same manner as described for the earlier scraper examples. Similarly, a removable blade assembly could be formed with a single truss structure 58 as in blade assembly 45 of FIG. 5D coupling walls 53 and 43 together at the midpoints of walls 53 and 43. A blade configuration with the single truss structure coupling to midpoints of walls 53 and 43 is constructed and arranged to conform to a surface with concave curvature, when a force loads the blade assembly against a concave surface and the material removal edges are in contact with the surface. A third removable blade assembly example 55 is shown in FIG. 5E and is analogous to the example depicted in FIG. 2E where structure 53 couples the midpoint of material removal wall 43 to the ends of a material removal wall 43. It is also contemplated that the truss structures of FIGS. 5D and 5E can be used with blade assemblies that incorporate a pair of continuous material removal edges, with any of the previously described variations in width, curvature, etc.

Any of the above truss arrangements for a removable blade assembly can be used with material removal walls pre-biased into a curve (i.e. pre-shaped such that they are not straight when in an unloaded condition) if desired, to accommodate a wider range of surface curvatures including surfaces with either convex or concave curvature. The pair of material removal edges may be curved the same or differently. The pair of material removal edges may have different radii of curvature. The pair of material removal edges may be pre-biased into convex or concave shapes in an unloaded condition.

It should also be noted that the pre-biasing of a material removal edge can aid in removing material from flat surfaces, as the pre-bias requires a certain amount of force to be applied to overcome the bias. This alters the force distribution across the material removal edges and will distribute relatively more force to the initial contact area in the middle of the blade (for example blade 50 and also edge 75 of example scraper 30 in FIG. 2F) with respect to force applied at the ends of blade 50 (or scraper 30), when the blade is pressed against either a flat or convex shaped surface.

Although material removal edges 51 and 52 are depicted in FIGS. 5A and 5B as having the same width, this is not required. It may be desirable to have one continuous material removal edge be narrower than the other, in order to facilitate scraping smaller surfaces such as vehicle side view mirrors. Also, though a removable blade assembly is being discussed here, a scraper similar to the scraper of FIG. 2A incorporating a pair of continuous material removal edges, where one continuous material removal edge is narrower than the other is also contemplated herein.

Figure 5C:
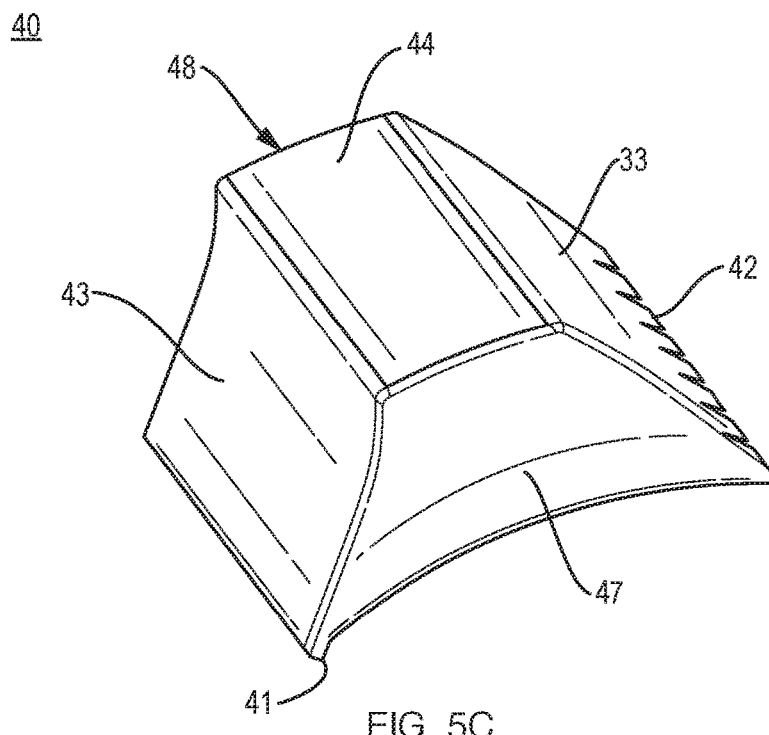
FIG. 5C is a perspective top view of a removable scraper blade assembly.
Figure 5D:
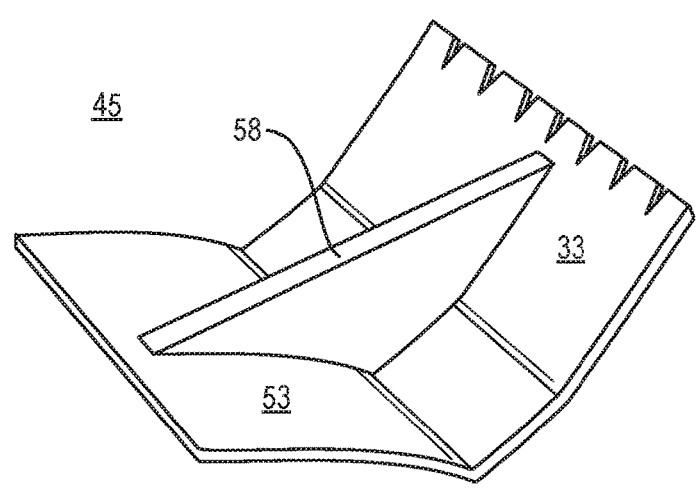
FIG. 5D is a perspective bottom view removable scraper blade assembly.
Figure 5E:
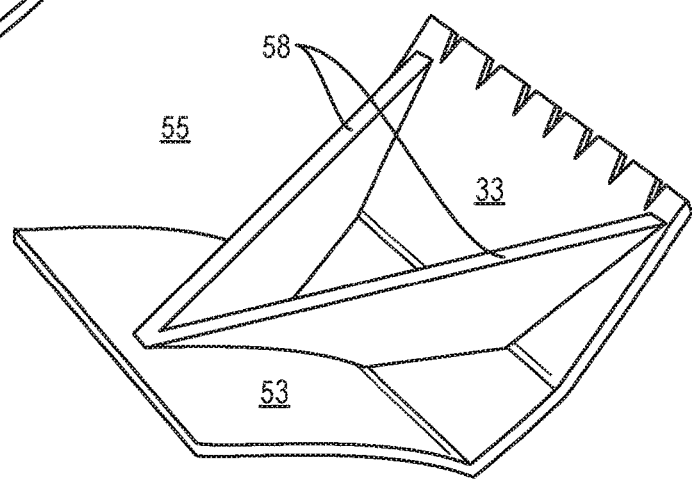
FIG. 5E is a perspective bottom view removable scraper blade assembly

FIG. 5C depicts a non-limiting example removable blade assembly 40 which incorporates one continuous material removal edge 41 in material removal wall 43 and one discontinuous material removal edge 42 in material removal wall 33. Side walls 47 and 48 couple between walls 43 and 33, and also to top surface 44. The pair of material removal edges may be straight when the removable blade is in an unloaded condition.

Alternatively, one or both of the material removal edges may be pre-biased to have either a concave or convex curvature when in an unloaded condition. They may have the same curvature or different curvature. They may have the same or different widths. In one example, discontinuous material removal edge 42 has a narrower width than continuous material removal edge 41. In one example, a continuous material removal edge is pre-biased into a curved shape (in an unloaded condition) and a discontinuous material removal edge is not pre-biased into a curved shaped. Removable blade 40 incorporates truss structures as before. Any of the truss structures previously described with respect to a full scraper can be applied to the removable blade assembly.

Figure 8:
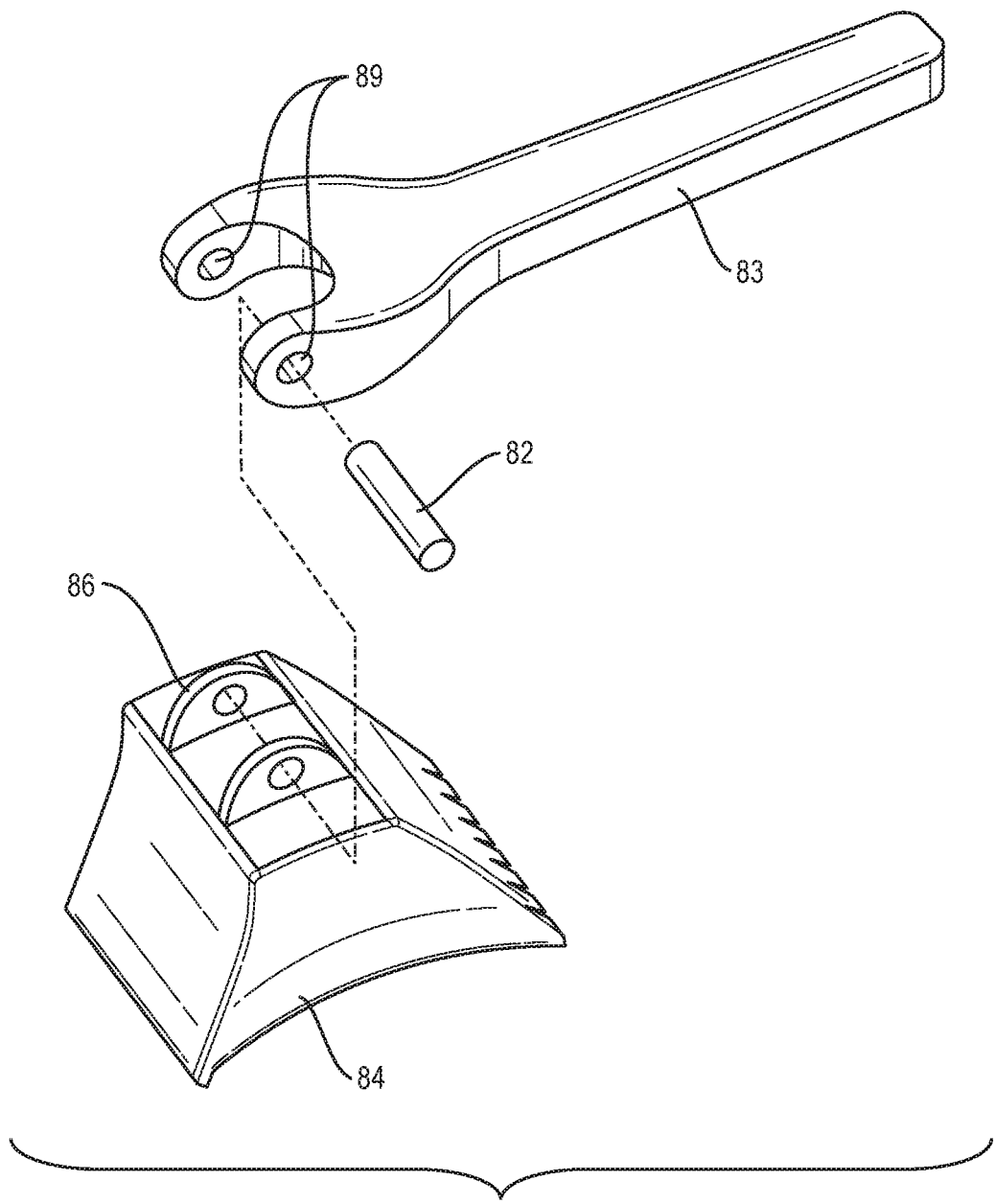
FIG. 8 is an exploded view of a long handle scraper incorporating a pivoting blade assembly.

In one non-limiting example, a removable blade assembly may be affixed with a fixed orientation to the scraper handle, such that it can only be fit to the scraper handle in a single orientation. In one non-limiting example, a removable blade assembly may be affixed to the scraper handle such that either material removal edge can be oriented to face outward, such that either material removal edge can act as a leading edge when the scraper is pushed forward along a surface by a user. In one non-limiting example, a scraper handle which accepts a removable blade assembly may incorporate a pivoting structure as depicted in FIG. 8 that allows either edge of the removable blade to function as a leading edge of the scraper when in use. Handle 83 includes pivot structures 89 that fit around pivot structures 86 of blade assembly 84. Pivot pin 82 fits into holes in pivot structures 89 and 86, and is used to transfer force form handle 83 to blade assembly 89. Pivot pin can be made removable so that blade assembly 89 can be changed is desired. However, in other examples, pivot pin is permanently affixed so that blade assembly 89 is no longer replaceable. The range of rotation of handle 83 with respect to blade assembly 89 should be greater than 90 degrees, and preferably is greater than 135 degrees, and more preferably is 180 degrees.

In one non-limiting example, a scraper body which accepts a removable blade may incorporate a rotating structure that allows the removable blade to be rotated such that either material removal edge of the blade can be oriented as a leading edge. A rotationally coupled blade assembly should have lockable detent positions, so the assembly cannot rotate when being used to scrape. It should be noted that a scraper incorporating a pivoting structure or a rotating structure or a compliant structure between an elongated handle and the blade assembly need not have a user removable blade. The blade assembly may be permanently affixed to the elongated handle during manufacture.

Figure 6:
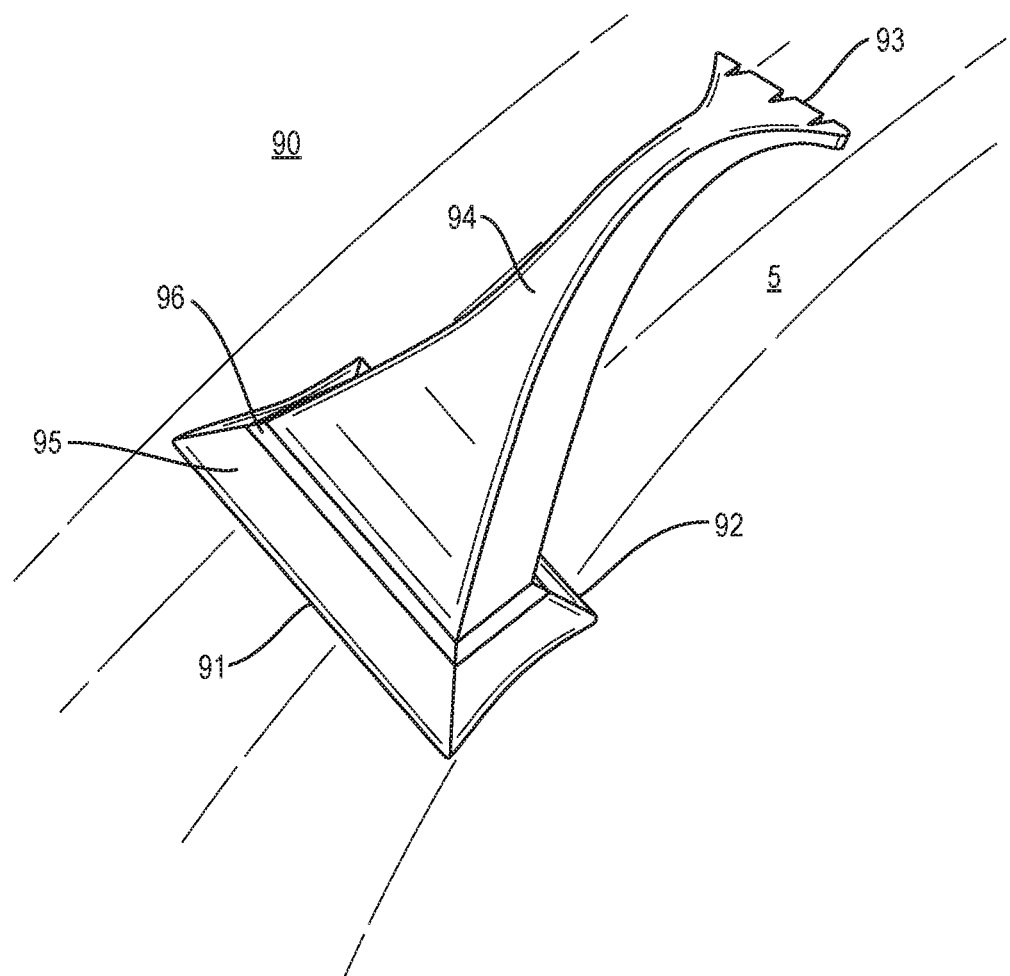
FIG. 6 is a perspective top view of an example scraper incorporating a removable scraper blade.

In one non-limiting example depicted in FIG. 6, elongated handle 94 is affixed to scraper blade assembly 95 having a pair of material removal edges (as in the various example scrapers and blade assemblies disclosed herein) such that the center of mass of the complete assembly no longer resides within the envelope of the pair of material removal edges. An elongated handle which extends along the length of the scraper a significant distance beyond the location of one of the material removal edges could be affixed to handle surface 64 as shown in FIG. 6, or be coupled to other structures as shown in FIGS. 8 and 9. In these examples, gripping the handle at a location outside of the projected envelope of the material removal edges requires the user to apply a force couple to hold the scraper in place against the surface, but provides the benefit of extending the length of the scraper for increased reach. Again, the blade assembly 95 can be removable by a user or may be fixed to the elongated handle during manufacture.

Example scraper 90 depicted in FIG. 6 shows a blade 95 compliantly coupled to a first end of a scraper body 94. The blade assembly 95 may be removable or may be fixed to scraper body 94 during manufacture. The blade assembly 95 incorporates a pair of continuous material removal edges 91 and 92, though any of the arrangements disclosed earlier for material removal edges is contemplated for use here (edges may be continuous or discontinuous, straight or pre-biased into a curved shape with same or different curvatures, and may be the same or different widths, in any combination). The scraper elongated handle 94 may include a third material removal edge 93 which may be of the discontinuous, toothed type or may be continuous, coupled to a second end of the scraper handle 94. The scraper handle may be of any desired length. In the example of FIG. 6, the length is sufficient to allow a single hand of a user to grasp the scraper handle 94. In one non-limiting example, the scraper handle is elliptically shaped. In other examples, a much longer scraper handle may be used to allow a user to grasp the scraper handle 94 with both hands, and to reach farther distances away from the user.

In the example scraper of FIG. 6, the scraper is constructed and arranged so that all three material removal edges can simultaneously contact the surface from which material is to be removed. This is possible because some relative angular rotation of the blade assembly 95 with respect to handle 94 is allowed (through the compliant mounting of the blade assembly to the handle). Relative angular rotation could also be obtained if the blade assembly were pivotably coupled to the scraper handle (using a pivot as in or similar to the pivot shown in FIGS. 8 and 9). When scraper 90 is arranged so that all three material removal edges are in contact with surface 5, the scraper handle arches up away from the surface a sufficient distance so that a user can wrap their gloved hand around the scraper handle 94 with sufficient clearance to fit the users gloved fingers between the underside of the scraper handle 94 and the surface 5. The clearance should be at least 1 inch, preferably at least 1.5 inches, and more preferably more than two inches between the bottom of the handle and the surface. The blade assembly 95 is compliantly mounted to the scraper handle 94 via a compliant gasket 96 (which may be formed from a sheet of elastomeric material, or may be overmolded to the scraper body 94 or the removable blade 95) so that the removable blade can rock slightly.

In another example, a scraper with an elongated scraper handle, which may be a tubular shaped handle with an arbitrary cross sectional shape, is constructed and arranged with a first blade assembly having a pair of material removal edges coupled to one end of the handle, and a second blade assembly coupled to the opposite end of the handle. The scraper can be used such that either the pair of material removal edges coupled to the first end of the scraper handle simultaneously contact the surface while a material removal edge or edges of the second blade assembly is/are held so as not to contact the surface, or a material removal edge or edges of the second blade assembly contact the surface while the scraper is held such that the material removal edges of the first blade assembly do not contact the surface. A long scraper handle may incorporate a telescoping handle arrangement that allows the length to be extended. Any of the blade assemblies disclosed herein can be used as the first and second blade assemblies.

Figure 9A:
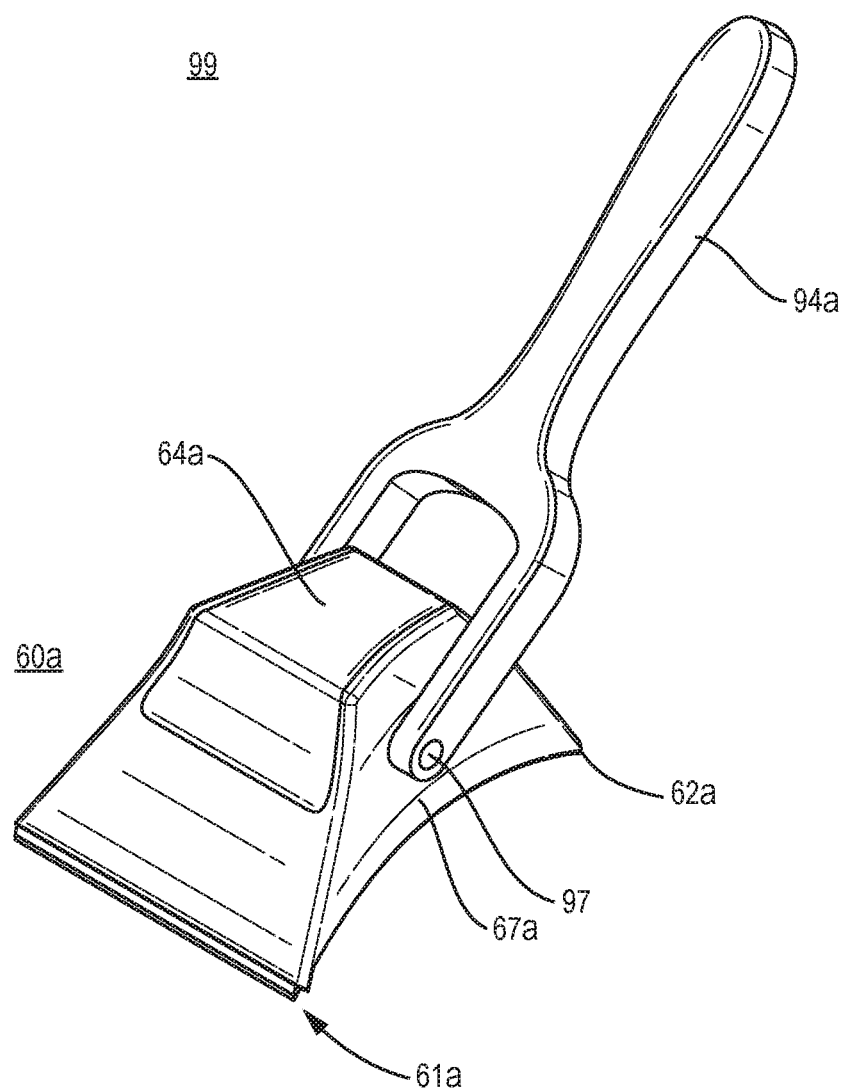
FIG. 9A is a perspective view of an alternative long handle scraper incorporating a pivoting blade assembly.
Figure 9B:
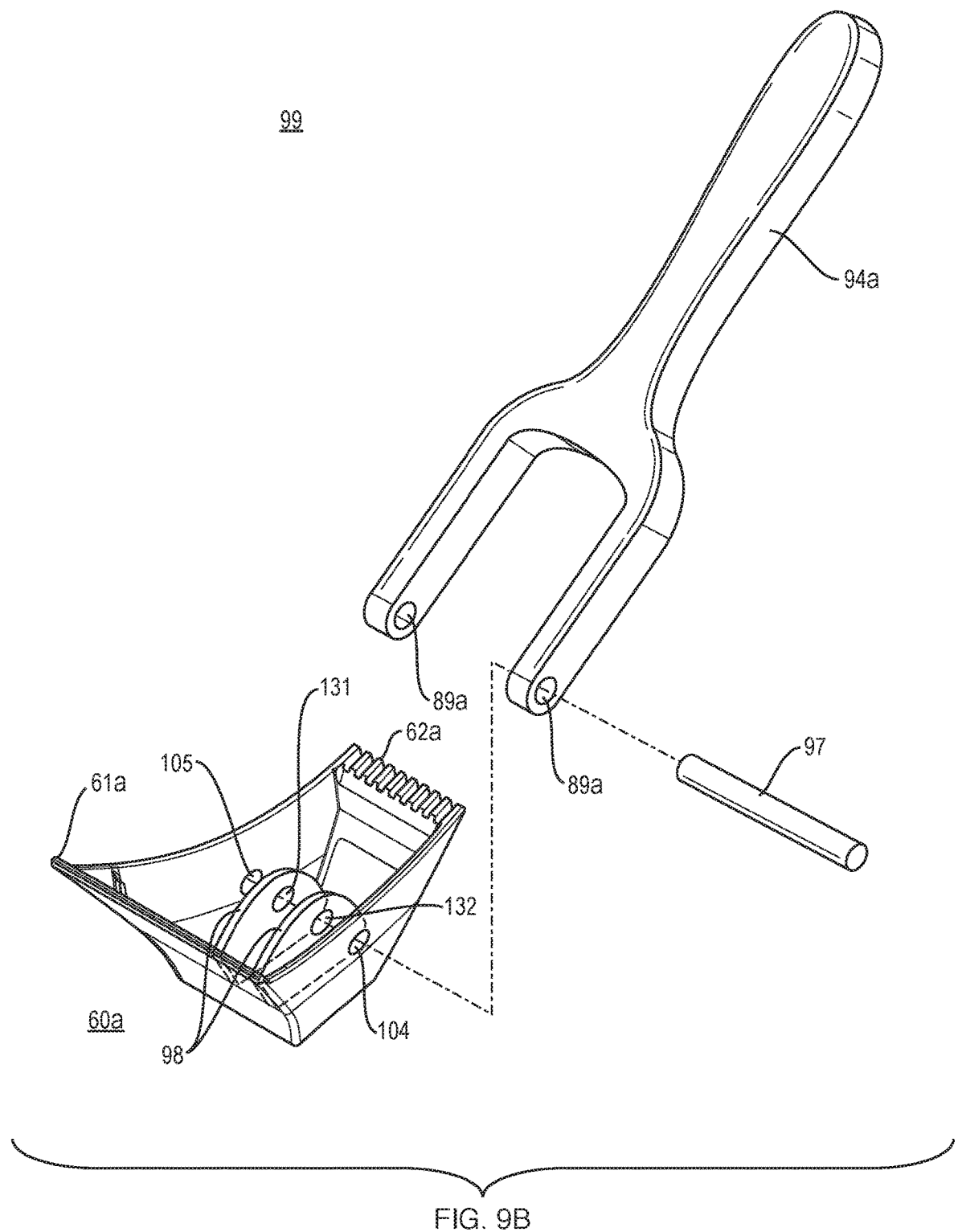
FIG. 9B is an exploded bottom view of the long handle scraper of FIG. 9A.

Turning to FIGS. 9A and 9B, non-limiting example scraper 99 is depicted. FIG. 9B shows an exploded view of scrapper 99 turned upside down form the view depicted in FIG. 9A. Scraper 99 pivotably couples blade assembly 60*a*, which in this example is similar to scraper 60 of FIG. 2A with the addition of pivoting features, to elongated handle 94*a*. Blade assembly 60*a* includes handle 64*a* which the user can grasp if desired. Handle 64*a* is positioned between the pair of material removal edges 61*a* and 62*a*, so that the user has an option to grasp the scraper in a location that does not require application of a force couple. Scraper 99 incorporates a pivot for coupling the blade assembly 60*a* to the elongated scraper handle 94*a*. The specific arrangement of the pivot is not limited, and any known pivot assembly can be used. In this example, a separate pivot pin 97 is fit through holes 89*a* in the end of handle 94, and through holes 131 and 132 in internal ribs 98 of blade assembly 60*a*. Holes 104 and 105 in blade assembly 60*a* are larger in dia. than the diameter of pivot pin 97 and holes 131 and 132 in ribs 98, so that force from the handle 94*a* is primarily transferred to the blade assembly from the elongated handle to the pivot pin and through internal ribs 98. This helps distribute more input force to assembly 60*a* near the middle of edges 61*a* and 62*a*, which is beneficial when using the scraper against flat surfaces. In other examples, ribs 98 may not be present and the pivot couples forces from the handle into side walls 67 and 68 (wall 68 not shown in this view). Pivotably attaching a blade assembly to an elongated handle has the benefit of allowing the user's hand/arm orientation with respect to the surface to be varied more widely for improved ergonomics while still helping ensure both material removal edges stay in simultaneous contact with the surface, and allows the device to be stowed away more easily.

The pivot allows the handle 94*a* to be rotated such that either material removal edge 61*a* or 62*a* can become a leading edge. The center of the pivot resides below handle 64*a*. This allows a user to place their hand on handle 64*a* to use blade assembly 60*a* similarly to how earlier described hand held scrapers (such as scraper 60 in FIG. 2A-2C) are used. It is desirable to locate the pivot center as low as possible in blade assembly 60*a*, close to the surface. This reduces the overturning moment of the scraper and helps keep the blade assembly 60*a* from pivoting when it impacts hard material. However, it should be noted that it is not required that a pivot allow the user to place their hand on top of the blade assembly. Useful examples may use a pivot that extends above the top surface of surface 64*a*, as shown in FIG. 8. If a blade assembly similar to the scraper shown in FIG. 2D is used, ribs would be located on the sides so that force from the handle can be applied to the ends of the blade assembly (away from the single truss structure).

Various scrapers incorporating an elongated handle are contemplated herein. Any of the hand-held scrapers and blade assemblies (as disclosed in FIGS. 2A-5E) may be used on one or both ends of an elongated scraper handle, in any combination. Any of the previously described truss structures and pre-bias curvatures of material removal edges can be used. Any of the disclosed scrapers or blade assemblies may be used on one end of an elongated handle, and individual material removal edges can be used on the opposite end of the elongated handle. Any of the hand-held scrapers or blade assemblies can be permanently or removably attached to the elongated handle. Any of the hand-held scrapers or blade assemblies can be fixed, compliantly coupled, pivotably or rotationally coupled to the elongated scraper handle. The elongated scraper body may have any desired length, accommodating either a single hand or both of a user's hands. The elongated scraper body may have extendable length. The elongated handle may incorporate a brush or pad for removal of snow.

Figure 7:
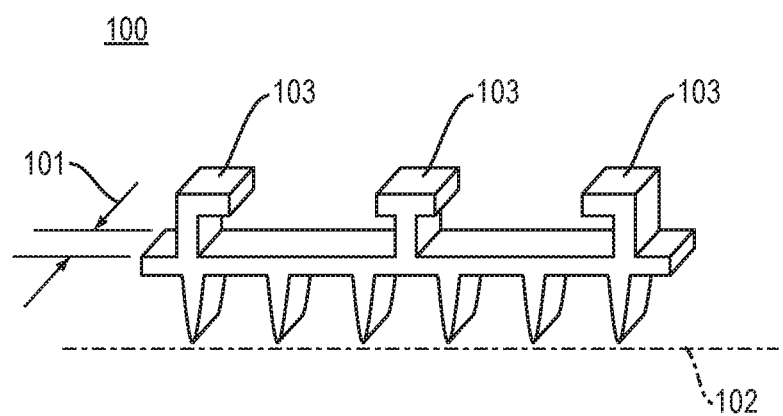
FIG. 7 is a perspective view of a discontinuous material removal structure.

In any of the previously described examples incorporating a discontinuous material removal structure, the discontinuous material removal structure can be formed from brass material. Non-limiting example discontinuous material removal structure 100 is shown in FIG. 7. Structure 100 is formed by cutting an extrusion to length 101. Fins 102 protrude from the structure and are used to score channels in hard material like ice adhered to a surface. Upper structures 103 are used to help hold the extrusion in place. Typically, a separate discontinuous material removal structure will be insert molded so that the upper portions of structure 100 are encapsulated in plastic of the scraper body. The upper structures shown are representative. Any extrudable shape can be used for these structures. Consideration should be made for the insert molding process to allow plastic to flow around the structures and maintain wall thickness specifications and flow properties. Other features could be machined if desired. Other methods of manufacturing a brass discontinuous material removal structure such as metal injection molding, casting, machining or other known metal forming processes are also possible, and example scrapers disclosed herein are not limited in the method used to form a brass discontinuous material removal structure.

Use of brass (which has higher Young's modulus than prior art polymer materials) allows thinner wall sections to be used which improves chipping/scoring performance. Chipping of ice in particular depends on the pressure exerted on the ice. The pressure at the interface of the discontinuous material removal edge with hard materials such as ice can be increased (while keeping the input force constant) by reducing the contact area. Using higher modulus brass allows thinner wall teeth to be used, which results in higher pressures at the interface of each tooth with the ice (assuming the number of teeth remain constant). Designs can use more teeth if desired with the same or reduced spacing for improved chipping. Discontinuous material removal edges formed of brass exhibit an improved ability to chip ice or score other harder materials compared to discontinuous material removal edges formed of polymer materials.

scrapers have two spaced apart material removal edges arranged for simultaneous contact with a surface. Example hand held scrapers have a handle located between the two spaced apart edges. When both material removal edges are in contact with the surface, the handle is raised sufficiently above the surface so that the surface does not appreciably interfere with the user's hand. The material removal edges are held at angles with respect to the surface that are effective for removing material (such as between 30 and 60 degrees). By constructing scrapers capable of having two edges in simultaneous contact with the surface with a handle spaced between the edges, the scrapers are stable against the surface and only a simple force is needed to hold them in place regardless of the orientation of the surface, while maintaining the edges at angles effective for scraping, preferably in the range of 30-60 degrees. Hand held scrapers, such as those shown in FIGS. 2A-4B have their center of mass located somewhere between the two edges in top view, when the scraper is placed on a flat horizontal plane, to ensure the scrapers sit stably and will not easily overturn or rotate in use.

Example scrapers have at least one continuous material removal edge that is constructed and arranged to conform to the shape of a surface when pressed against the surface and a second edge which may be continuous or discontinuous. A second continuous edge if used can be constructed and arranged to conform to the curvature of the surface, but it is not required. Continuous material removal edges may be pre-biased such that in their unloaded state, the edges have a curvature. Edges may be pre-biased into convex or concave shapes. In example scrapers having two continuous material removal edges, the unloaded curvatures of the edges can differ. One edge may be linear while the second edge is pre-biased into a curved shape. Both edges may be pre-biased into curved shapes, where the radius of curvature may be the same or different. One edge may be pre-biased in its unloaded state into a concave shape, while the other material removal edge is pre-biased into a convex shape in its unloaded state, with the same or different radii of curvature. The edges may be the same width or different widths.

Example scrapers may have one continuous material removal edge constructed and arranged to conform to the curvature of a surface and a second material removal edge that is discontinuous. The discontinuous edge may be constructed and arranged to conform to the curvature of the surface, but this is not required. Example scrapers with one continuous and one discontinuous material removal edge are constructed and arranged to hold the edges at angles with respect to the surface effective for scraping, preferably in the range of 30-60 degrees. The edges may be the same width or different widths.

Example scrapers may have material removal edges that are integral to the scraper body or separate components may be used. Plastic edges can be formed directly in an injection molded scraper. Separate components can be used for either or both of the continuous and discontinuous material removal edges. A strip of brass material can be insert molded in one end of a material removal wall to provide a brass continuous material removal edge. A brass component having teeth or ridges (formed as an extrusion, a casting, by machining or metal injection molding, or other known metal forming techniques) can be insert molded in the end of the material removal wall arranged to incorporate a discontinuous material removal edge.

Side walls of example scrapers couple together a pair of material removal walls containing a first and a second material removal edges, where the material removal edges can be either continuous or discontinuous. The side walls may be formed as truss structures where bending loads applied to the material removal edge or edges are transformed into tension and compression loads in the top and bottom chords of the truss.

In other example scrapers, truss structures couple to the middle of a material removal wall, near the location of a material removal edge, to allow the edge to deform to conform to surfaces with concave curvature. Example scrapers may have edges constructed and arranged to conform to convex or concave surfaces in any combination. Any of these edges can be pre-biased into convex or concave shapes, in any combination. The edges may be the same width or different widths, the edges may be pre-biased in different amounts. All possible combinations of edges (continuous and discontinuous), deformation (convex or concave shape with same or varying radii of curvature), with any width are contemplated herein. Truss structures may have truss panels which can be either open or closed. Open truss panels may have additional angled members.

An elongated handle can be affixed to the example scrapers and blade assemblies described herein in order to extend the reach of an individual. The blade assembly can be rigidly affixed, can be pivotably attached, or be compliantly attached to the elongated handle. The blade assemblies can be user removable or fixed to the handle during manufacture. Removable blade assemblies can be formed from plastic, brass, or a combination thereof. Removable blades can be replaced by a user if they become dented, damaged or broken, without having to replace the entire scraper. The blade assembly can have handle that couples top ends of material removal walls together on which a user can apply a simple force. Using a pivot also allows the elongated handle to fully rotate around the blade assembly so that either material removal edge can be used as a leading edge. The elongated handles can be of any length, and may be extendable by the user.

Any of the described blade assemblies could also be coupled to the far end of an elongated handle. Alternatively, single edge assemblies (continuous or discontinuous) can be attached to the far end of the elongated handle. In one non-limiting example, a blade assembly having a discontinuous material removal edge and a continuous material removal edge couples to one end of an elongated handle, and an assembly with a single continuous material removal edge is attached to the other end of the elongated handle.

If a long handle is attached to blade assembly structures described herein, the handle 64 and grip area present in the hand-held scraper versions can be substantially reduced in size if desired, and will resemble the removable blades depicted in FIGS. 5A to 5E. If the user can grip the long handle, there is no need to provide a grip location between the pair of material removal edges.

In some examples, a blade assembly is rotationally coupled to an elongated handle. This allows either of the pair of material removal edges to be made leading. A rotationally coupled blade assembly should have lockable detent positions, so the assembly cannot rotate when being used to scrape. A scraper can be both rotationally and compliantly mounted to a long handle, improving the ability to keep both edges in contact.

Use of a long handle provides design flexibility as material removal structures can be added to the far end of the long handle. In one non-limiting example, a scraper has an elongated handle which at one end attaches to a blade assembly comprising a pair of continuous material removal edges with at least one edge configured to conform to the curvature of a surface from which material is to be removed, as described earlier. Attached to the other end of the elongated handle is a single discontinuous material removal edge.

A number of implementations have been described. Nevertheless, it will be understood that additional modifications may be made without departing from the scope of the inventive concepts described herein, and, accordingly, other embodiments are within the scope of the following claims.

What is claimed is:

1. A scraper for removing adhered material from a surface having a curved shape, comprising:
    a first material removal wall comprising a first material removal edge which is continuous,
    a second material removal wall comprising a second material removal edge which is discontinuous, the first and second material removal edges spaced apart from each other and arranged at an angle such that the continuous and discontinuous material removal edges can make simultaneous contact with the surface for effective bi-directional scraping,
    a handle for gripping the scraper and pressing the scraper against the surface, the handle formed between a top end of the first material removal wall and a top end of the second material removal wall,
    a first wall structure coupled to the first material removal wall near a first outermost corner of the first material removal edge, the first wall structure forming a first side of the scraper, the first wall structure also coupled to one or both of the handle and the second material removal wall,
    a second wall structure coupled to the first material removal wall near a second outermost corner of the first material removal edge forming a second side of the scraper, the second wall structure also coupled to one or both of the handle and the second material removal wall,
    wherein the first and second wall structures provide rigidity against deflection of the first and second outermost corners of the first material removal edge to enable the first material removal edge to deform to conform to the shape of the surface when the scraper is pressed against the surface during operation.

2. The scraper of claim 1 wherein the first material removal edge is pre-biased to have curved shape in an unloaded condition.

3. The scraper of claim 1 wherein the first material removal wall, the second material removal wall and the handle together form a generally arch shaped scraper body.

4. The scraper of claim 1 wherein the first and second wall structures comprise first and second trusses comprising first and second truss panels.

5. The scraper of claim 4 wherein the first and second truss panels are open.

6. The scraper of claim 5 wherein first and second openings in the first and second truss panels are not large enough to allow a user's thumb to fully penetrate through the opening.

7. The scraper of claim 1 wherein the first material removal edge is made of brass.

8. The scraper of claim 1 wherein the second material removal edge is made of brass.

9. The scraper of claim 1 wherein the scraper is constructed and arranged such that it can fit into typical sized glove boxes and storage bins of automotive vehicles.

10. The scraper of claim 1 wherein the the first material removal edge has a width, wherein when the scraper is pressed against a surface having a radius of curvature greater than or equal to 1.5 meters with a force applied to the handle of 50N, the force applied by the first material removal edge to the surface is at least 10 N at every point along the width of the first material removal edge.

11. The scraper of claim 10 wherein the width of the first material removal edge is at least 100 mm.

12. The scraper of claim 1 wherein the handle is arranged such that the palm of a user's hand can rest on the handle and the user's fingers can rest on either of the first or second material removal walls, to allow the user to apply a force to the handle with their palm and to apply a force to either of the first or second material removal walls with their fingers.

13. The scraper of claim 1 wherein a projected location of the center of mass of the scraper is located between the projected locations of the first material removal edge and the second material removal edge.

14. The scraper of claim 1 wherein when the first and second material removal edges are in contact with the surface, the handle is sufficiently above the surface so that a user's thumb can rest on a side wall of the scraper without interference from the surface.

15. The scraper of claim 1 wherein the angles are between 30 and 60 degrees.

16. The scraper of claim 1 wherein the first and second material removal edges are spaced apart a distance greater than 70 mm.

17. The scraper of claim 1 wherein the first and second wall structures have a shape, where the shape is one of the group of shapes consisting of: triangular and trapezoidal.

18. The scraper of claim 1 wherein the first material removal edge has a first width and the second material removal wall has a second width, wherein the second width is narrower than the first width.

19. A scraper for removing adhered material from a surface, comprising:
    a first material removal wall comprising a first continuous material removal edge and a second material removal wall comprising a second continuous material removal edge, wherein the first and second material removal edges are spaced apart from each other, wherein the first and second material removal edges are capable of being deformed to conform to the shape of the surface, a handle for gripping the scraper located between projected locations of the first material removal edge and the second material removal edge, wherein the handle is mechanically coupled to top ends of the first and second material removal walls, opposite ends of the first and second material removal walls that incorporate the first and second material removal edges, wherein the scraper further comprises a first structure coupled to the first material removal wall near the first material removal edge and coupled to the second material removal wall near the second material removal edge forming a first truss, to variably transform bending loads applied to the first material removal edge and the second material removal edge into tension and compression loads in the first truss, wherein the scraper is constructed and arranged such that the first and second material removal edges can make simultaneous contact with the surface, wherein included angles, formed between the first and second material removal walls and the surface when both the first material removal edge and the second material removal edge of the scraper are in contact with the surface, are effective for scraping, wherein the first material removal edge is pre-biased to have curved shape in an unloaded condition, wherein the first material removal edge is pre-biased to have curved shape in an unloaded condition, and;

wherein the pre-biased curvature of the first material removal edge is different from the pre-biased curvature of the second material removal edge.

20. A scraper for removing adhered material from a surface having a curved shape, comprising:

a first material removal wall comprising a first material removal edge which is continuous, the first material removal edge capable of being deformed to conform to the shape of the surface, a second material removal wall comprising a second material removal edge which is discontinuous, the first and second material removal edges spaced apart from each other, a handle for gripping the scraper, a projected location of the handle located between projected locations of the first and second material removal edges, a first structure coupled to the first material removal wall near the first material removal edge and to one or both of the handle and the second material removal wall forming a first truss, to variably transform bending loads applied to the first material removal edge into tension and compression loads in the first truss, wherein the handle is mechanically coupled to top ends of the first and second material removal walls opposite the ends of the first and second material removal walls incorporating the first and second material removal edges, wherein the scraper is constructed and arranged such that the continuous and discontinuous material removal edges can make simultaneous contact with the surface, wherein included angles, formed between the first and second material removal walls and the surface, when both the continuous material removal edge and the discontinuous material removal edge of the scraper are in contact with the surface, are effective for scraping, wherein the first material removal edge has a width, wherein when the scraper is pressed against a surface having a radius of curvature greater than or equal to 1.5 meters with a force applied to the handle of 50N, the force applied by the first material removal edge to the surface is at least 10 N at every point along the width of the first material removal edge.

21. The scraper of claim 20 wherein the width of the first material removal edge is at least 100 mm.

* * * * *